United States Patent [19]
Greatline et al.

[11] Patent Number: 5,919,242
[45] Date of Patent: Jul. 6, 1999

[54] METHOD AND APPARATUS FOR PRESCRIPTION APPLICATION OF PRODUCTS TO AN AGRICULTURAL FIELD

[75] Inventors: Martin W. Greatline, West Salem; Stanley E. Greatline, Albion, both of Ill.

[73] Assignee: Agri-line Innovations, Inc., Albion, Ill.

[21] Appl. No.: 07/882,811

[22] Filed: May 14, 1992

[51] Int. Cl.$^6$ .................................................. G01C 21/14
[52] U.S. Cl. ............................................................. 701/50
[58] Field of Search ...................... 364/424.07, 474.01, 364/457; 111/130, 118; 221/1; 239/62; 342/357

[56] References Cited

U.S. PATENT DOCUMENTS

| | | | |
|---|---|---|---|
| 4,890,233 | 12/1989 | Ando et al. | 364/457 |
| 5,014,914 | 5/1991 | Wallenas | 239/62 |
| 5,033,397 | 7/1991 | Colburn, Jr. | 111/118 |
| 5,050,771 | 9/1991 | Hanson et al. | 221/1 |
| 5,260,875 | 11/1993 | Tofte et al. | 364/424.07 |

*Primary Examiner*—Kevin J. Teska
*Assistant Examiner*—Dan Fiul
*Attorney, Agent, or Firm*—Beck, Michael & Beck, P.C.

[57] ABSTRACT

A prescription farming control system includes a navigation controller and a product delivery controller for controlling the rate of operation of a number of agricultural product delivery mechanisms mounted on an applicator vehicle as a function of the global position of the vehicle in an agricultural field. Information is stored in computer memory on board the vehicle to define a number of layers corresponding to each of the delivery mechanisms, each layer including a number of zones representing different levels of activity of the corresponding mechanism. Each zone is defined by a plurality of vertices, rather than on a pixel-by-pixel basis. The navigation controller receives satellite positioning data to combine with pseudorange correction data received from a fixed ground station to determine a corrected accurate global position of the vehicle. A graphics coprocessor includes active invisible graphics memory page onto which each layer is sequentially drawn and interrogated. One user selected layer can be stored on an inactive visible graphics memory page for visual display and then page flipped to the active page for subsequent interrogation. The pixel on each layer associated with the current global position of the vehicle is interrogated to determine the proper level of activity of the delivery mechanism at that location. The product delivery controller includes features to prevent re-application of a product on portions of the agricultural field over which the vehicle has already traveled.

16 Claims, 15 Drawing Sheets

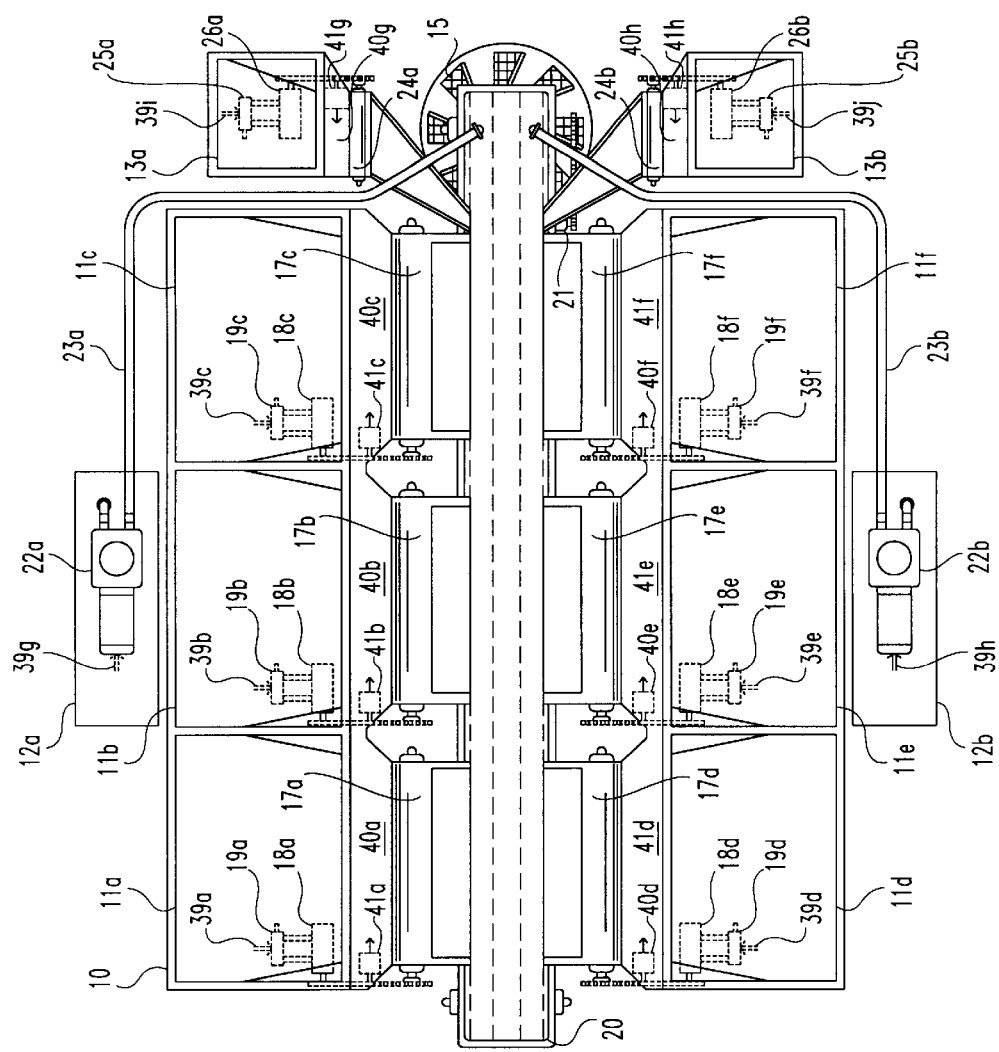
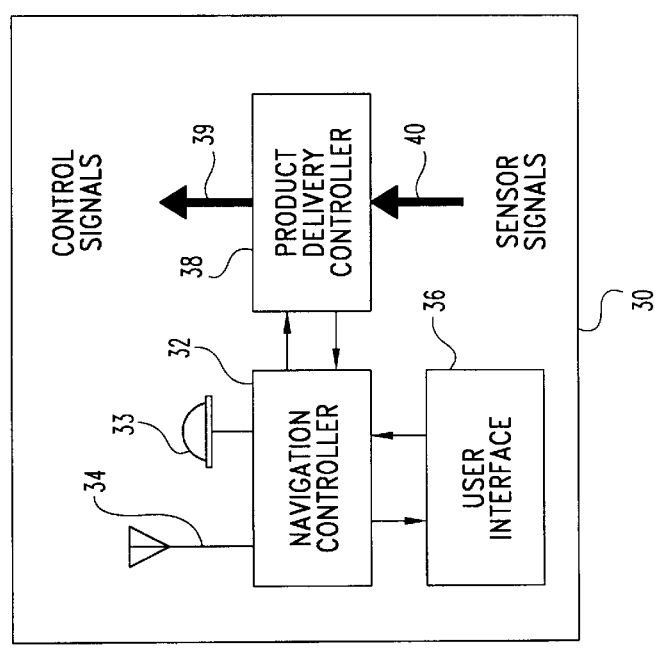
Fig. 2

MOVING MAP FUNCTION
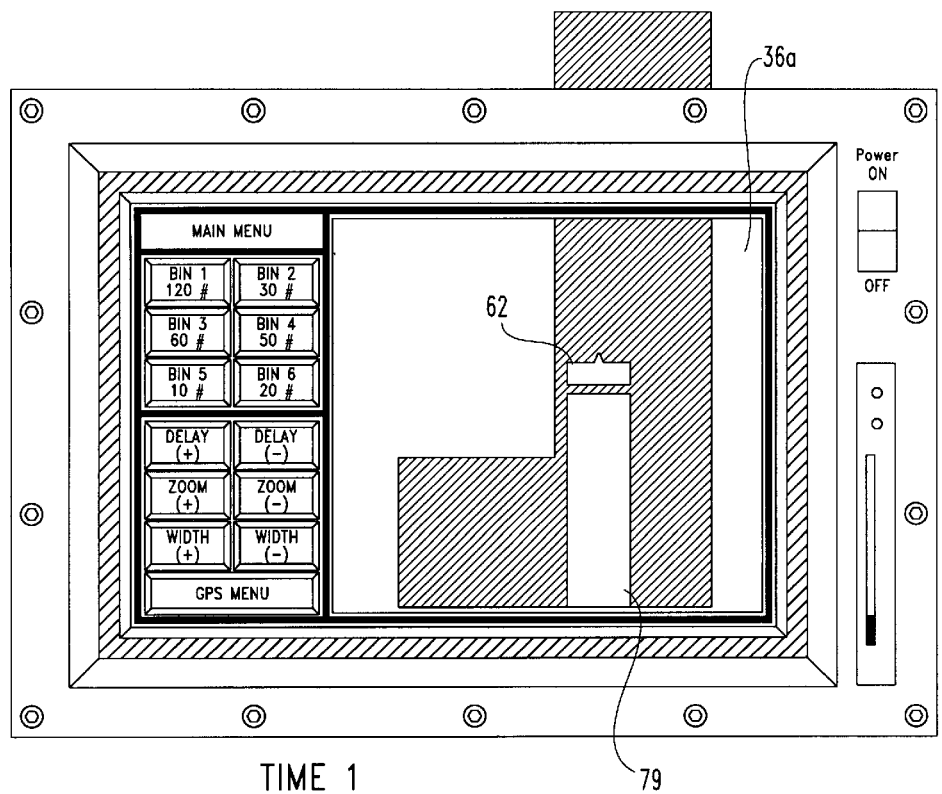
TIME 1
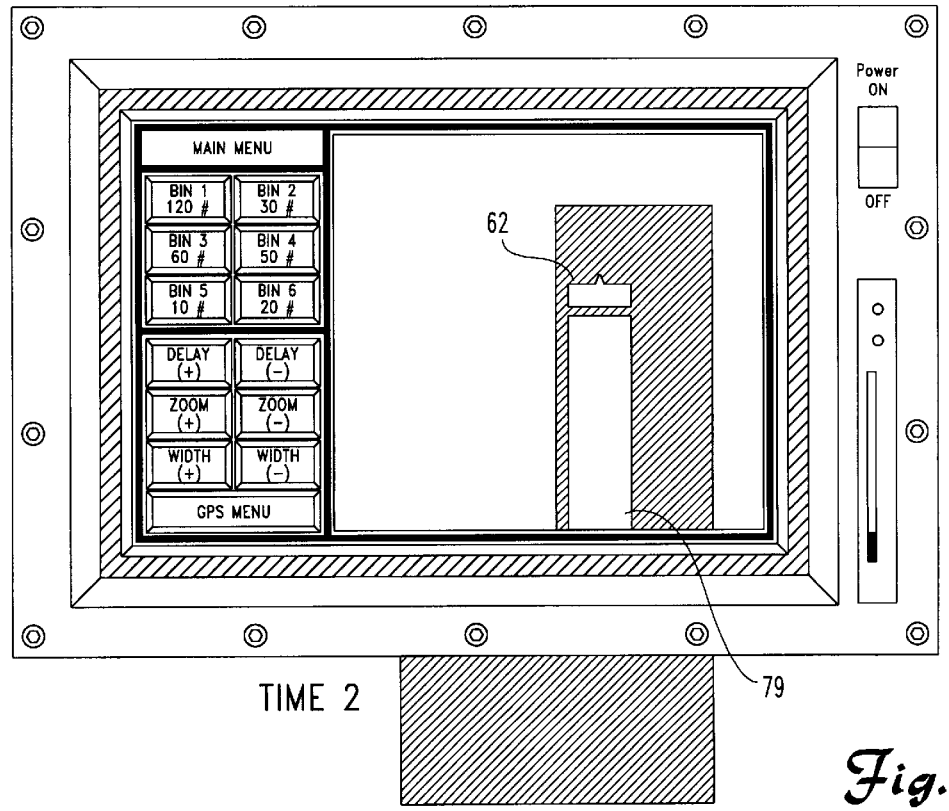
TIME 2
Fig. 11

ZOOMING FUNCTION

METHOD AND APPARATUS FOR PRESCRIPTION APPLICATION OF PRODUCTS TO AN AGRICULTURAL FIELD

BACKGROUND OF THE INVENTION

The present invention concerns a method and apparatus for controlling the manner of operation of functional devices based upon navigational input. Such a method and apparatus is particularly useful in the application of chemical products, such as fertilizer, to agricultural or farm land. More specifically, the invention contemplates a method and apparatus for prescription application of these agricultural products to the land wherein specific chemical blends are applied in accordance with the needs of various soil types and crops.

It is known in the agricultural art that a given tract of agricultural land, or a field, possesses variable characteristics that relate and contribute to crop fertility. The presence of different soil types and existing soil constituency levels contribute to this variability. Certain areas of a field will require different farming inputs, such as pesticides, nutrients and irrigation, than other areas of the same field. The practice of matching inputs with crop soil requirements has come to be known as "prescription farming". In general, the focus of prescription farming on varying the application rates of farming inputs from point to point within a field, rather than using a single, average rate over the entire field. The goal of prescription farming is to supply crops with only the inputs that they require, and no more, to provide maximum yields.

For decades, farmers have practiced prescription farming by manually applying additional inputs in specific areas of a given field where the farmer knew from experience (and often trial and error) that such additional inputs were needed. Such manual application of inputs is relatively inaccurate and unscientific.

Attempts have also been made to mechanize the process of prescription farming. To this end, there are applicator vehicles currently on the market equipped with systems to allow application of varying rates and/or combinations of inputs. Such variable applicator vehicle systems are equipped with electronic product delivery controllers which signal the system pumps and/or motors to vary the rates of application of the various inputs carried on board the vehicle. These variable rate applicator vehicles help to increase the accuracy of application. However, the problem still remains with these systems of navigating through the field. Although a farmer can determine and vary the rate of application of a particular input, the accuracy of the prescription farming process is questionable if the farmer cannot precisely determine his position in the field during the application process as the applicator vehicle is moving.

To this end, attempts have been made to increase the accuracy of the prescription farming process by generating computer-readable maps that set forth prescriptions on a field-by-field basis. This approach contemplates a computer mounted on the applicator vehicle which interfaces with electronic product delivery controllers which control the various input pumps and motors. Although these approaches have taken steps toward more accurate prescription farming, several inadequacies remain.

First, current methods of mechanizing prescription farming use dead reckoning as a navigation method to determine the position of the applicator vehicle as it moves through the field. This means that the position of the vehicle is based at all times on its relation to a fixed starting position. The vehicle's relative position in the field is a function of a predetermined (rather than actual) speed and the vehicle travel time to determine a distance as measured from the fixed starting position. One drawback of this approach is that the vehicle must be driven at a fixed speed that has been previously provided to the on-board computer. Another drawback is that the vehicle must be driven in fairly straight and parallel lines through the field, often requiring superior driving skills on the part of the vehicle operator. Moreover, with this approach, the application process must be put on stand-by when a turn is made at the end of the field, otherwise the dead reckoning system will incorrectly determine that the vehicle is farther along in the field than its true position justifies. If the vehicle operator begins at the wrong point in the field, drives in the wrong direction, fails to maintain a straight driving path, or forgets to put the system in a stand-by mode during a turn, the application process will fail in its essential purpose because inputs will be applied at improper locations on the field. With this prior art dead reckoning approach, even the slightest operator oversight or error can result in improper application of input products to the field.

Second, current mechanized prescription farming methods require data contained on the digital prescription map to be reduced to a relatively small number of variables. Four example, if a given field requires ten rate variations of six inputs, or products, one million possible application combinations result. Prior digital prescription farming techniques are not capable of storing this much information, and instead are limited to about five variations for up to six different products. This severe restraint prohibits effective prescription determination and generation, as well as effective data management within the on-board computer.

Third, current mechanized prescription farming methods require field maps to be generated in a raster format in which each pixel on the computer monitor is assigned a discrete digital value representative of the soil type at the location of the field represented by the pixel. This protocol severely limits the size of the field that can be represented or contained on a single map while still maintaining accuracy.

In short, prior computer-based mechanized prescription farming systems have required excessive operator input with little room for human error. In addition, these systems are often unwieldy in their implementation, even with digital computer technology.

SUMMARY OF THE INVENTION

The present invention contemplates a method and apparatus to act as a navigation controller for interfacing with electronic product delivery controllers on a farming input applicator vehicle. The invention derives the navigation information using the global positioning system (GPS).

Specifically, the invention uses differential, kinematic GPS to determine the precise global position of the applicator vehicle in an agricultural field. A computer system reads farming input prescription information, interprets this information, and sends appropriate instructions to the product delivery controllers as a function of the global position of the vehicle in the field. The farming input prescription information is preferably made available to the computer system on a solid state battery backed random access memory (RAM) or electrically erasable programmable read only memory (EEPROM) disk. Prescription boundary information is provided in a vector format in global, real-world coordinates, such as latitude and longitude (lat-lon). Each prescription area, referred to as a "zone", is differentiated according to a user-assigned color scheme.

The prescription data is arranged so that each input or product is represented by a "layer", each layer in turn containing several zones corresponding to a specific rate of application of the product. For example, a first layer might represent potash which can be applied at ten different rates within a given field. In accordance with the present invention, a digital map of the field includes one layer assigned to potash that is segmented into ten zones, each represented by a different color. A second layer might represent the input/product potassium for which only three different application rates are required within the field. Thus, the digital map would include a separate defined layer for potash having only three zones. It can be seen that in accordance with the present invention, prescription data for a field is represented by a digital map containing multiple layers, each representing a separate product/input, each layer containing multiple zones representing different rates of application of the particular product.

Components of the computer system of the present invention are mounted in the applicator vehicle and interfaced to electronic product delivery controllers of the vehicle. As the vehicle is driven through the field, the on-board computer components determine the position of the vehicle in the field using data obtained from vehicle mounted GPS receiving equipment. Software within the on-board computer accesses the prescription information contained in the solid state memory and analyzes each layer of the digital map to determine the application rate for each product required for the specific position of the vehicle, and then instructs the product delivery controllers accordingly.

Since the present invention uses real-world coordinates (lat-lon) to define the position of the vehicle on the field, there is no need for the required fixed starting point, scheduled drive pattern for the applicator vehicle or stand-by mode to perform a turn at the end of the field. In addition, the on-board computer of the invention records the global coordinates over which the vehicle has already traveled and automatically prevents the application of product over an area more than once, thereby eliminating the dangers of over-application present with prior systems. A display monitor in the cab of the applicator vehicle includes a display of the agricultural field with an icon or symbol representing the location of the vehicle. In one aspect, the vehicle symbol always remains in the center of the map display. Moreover, the invention contemplates capabilities to "zoom" in and out on the field display, thereby eliminating field size constraints.

BRIEF DESCRIPTION OF THE DRAWINGS

FIG. 2 is a top view of an applicator vehicle for use with the present invention with the navigation controller and product delivery controller of the invention represented schematically.

FIG. 11 is a pictorial representation of two map displays on the display console illustrating the moving map feature implemented by software in accordance with the present invention.

DESCRIPTION OF THE PREFERRED EMBODIMENTS

Figure 1:
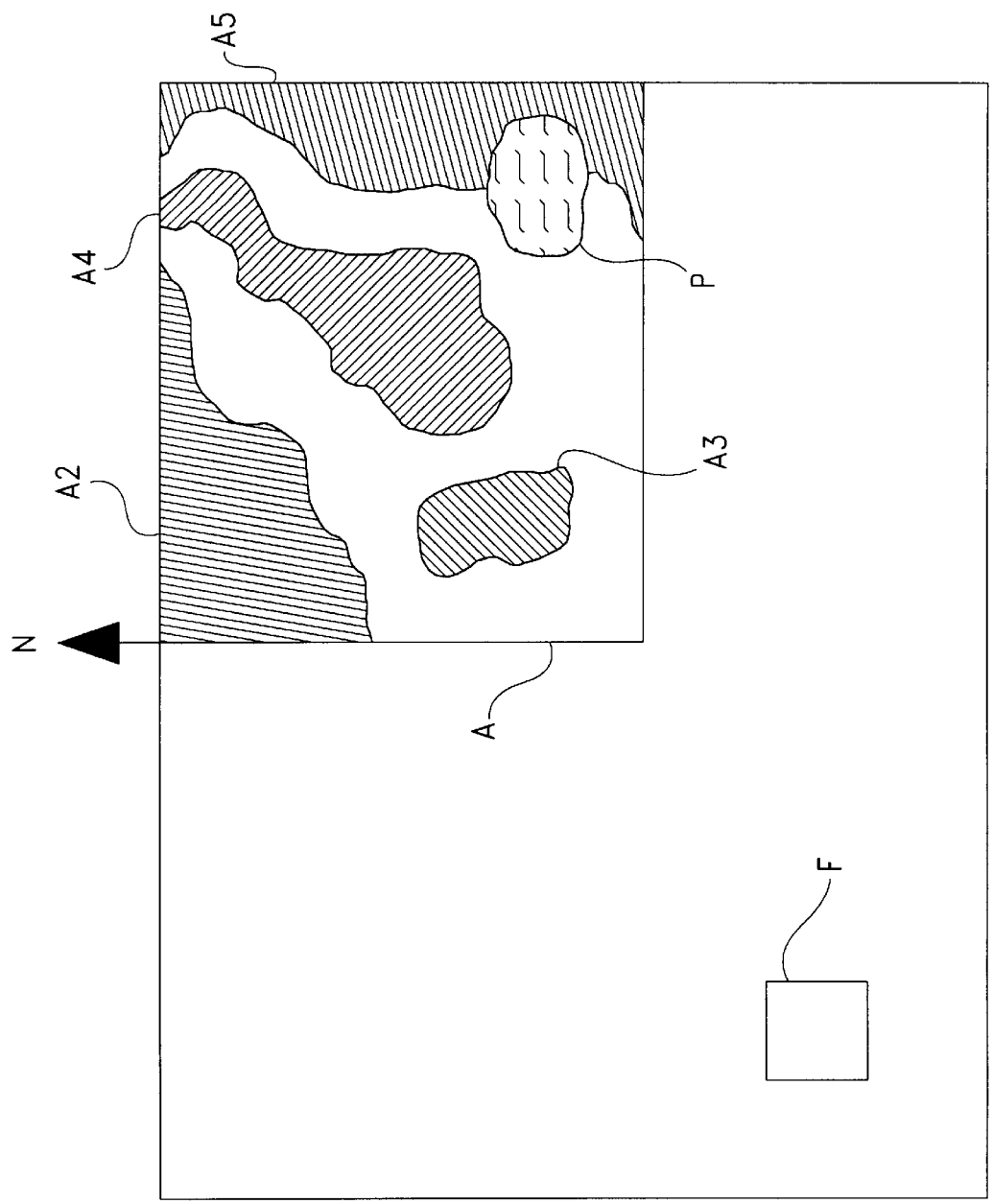
FIG. 1 is a graphical representation of an agricultural field positioned within a tract of farm land.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The environment for use of the present invention is depicted first in FIG. 1. Specifically, FIG. 1 represents a tract of land, with a farmhouse or equipment storage facility F showing at one corner of the tract of land. The tract of land also includes acreage A to be treated by the farmer, namely a growing field which is to be treated with certain agricultural products and chemicals. The acreage A can include a pond P and a number of treatment prescription areas $A_1$–$A_5$. In a more rudimentary form, the areas $A_1$–n represent regions of different soil types. For instance, these regions can correspond to soils having different moisture retention capabilities or moisture content. The specific soil composition for each of these regions can then be integrated into a System for determining a prescription to be applied to the field based upon the particular crops to be grown and the characteristic of the soil at the various locations in the acreage A.

Referring now to FIG. 2, a spreading apparatus or applicator vehicle 10 is depicted which is used in connection with the present invention. In particular, the vehicle 10 can include a number of product bins $11_{a-f}$. Each of the bins may contain a variety of agricultural bulk products, such as granular fertilizers. In addition, the vehicle 10 includes a pair of liquid tanks $12_a$ and $12_b$ which can be used to carry liquid herbicides or insecticides, for example. Further, a pair of accessory bins $13_a$ and $13_b$ can also be provided for additional granular micronutrients. The contents of each of the bins and liquid tanks is fed to a rotary spreader 15 which dispenses the agricultural products onto the field. The product is discharged from each of the bins $11_{a-f}$ by way of a corresponding rotary feeder $17_{a-f}$. The feeder is driven by a motor $18_{a-f}$ which is itself commanded by a controller $19_{a-f}$. The bulk product dispensed from each of the bins is fed onto a product conveyor 20 which conveys the product down to the rotary spreader 15. The conveyor 20 is driven by a separately controllable motor 21.

Product is dispensed from the liquid tanks $12_a$ and $12_b$ by way of a corresponding pump $22_a$, $22_b$ through a corresponding line $23_a$, $23_b$ to the location of the rotary spreader 15. The accessory bins $13_{a-b}$ also include corresponding rotary feeders $24_{a-b}$, motor $25_{a-b}$ and motor controller $26_{a-b}$.

The applicator vehicle 10 also includes an on-board system controller 30 which ultimately provides signals to each of the controllers for each of the product dispensers. The system controller 30 includes a navigation control 32 which receives global positioning information from a data receiver 33 and correction data information from a second receiver 34. A user interface 36 is provided which can include a keyboard or touch screen, and a display to allow the farmer to monitor the performance of the system, obtain feedback information, and reconfigure the system control as required.

The navigation controller provides information to a product delivery controller 38, which information includes the current position of the applicator vehicle 10, typically in terms of latitudinal and longitudinal (lat-lon) coordinates. Alternatively, the lat-lon coordinates can be replaced by universal trans-mercatur (UTM) coordinates. A number of algorithms implemented by the product delivery controller 38 determines the appropriate prescription based upon the global location of the applicator vehicle 10 relative to the digital map information provided to the controller. Control signals 39 are produced by the controller 38 which are fed by way of separate individual signals $39_{a-j}$ to each of the controllers, pumps and motors associated with the applicator vehicle. In addition, the product delivery controller 38 receives sensor signals 40 which are a compilation of a number of signals $40_{a-h}$ from a number of sensors $41_{a-h}$ associated the product dispensing components. These sensor signals can provide information concerning the state of the particular product dispensing mechanism (for example, full or empty), of a malfunction of the system, or of actual product quantity dispensed from the particular bin or tank.

As described above, a critical aspect of the invention is the ability to navigate the applicator vehicle (hereinafter referred to as the unit under control—UUC). Proper implementation of the agricultural product delivery prescription requires knowledge of the precise location of the UUC with respect to the acreage being treated. Thus, the digital map representing the acreage A shown in FIG. 1, includes information concerning the exact latitudinal and longitudinal coordinates of the acreage and of the treatment prescription areas $A_{1-n}$. Likewise, the exact location of the UUC must be ascertained during application of the prescription products. The mobile navigation controller 32 shown in FIG. 2 accomplishes that function.

In the preferred embodiment of the present invention, the global positioning system (GPS) is used to provide relatively exact and continually updated information concerning the position of the UUC in global coordinates. In one aspect of the present invention, a differential GPS protocol is implemented. It is also known that GPS signals being received from a number of orbiting satellite are subject to a number of errors which dilute the navigation accuracy of the mobile navigation controller 32. It is known that the navigational accuracy of a GPS receiver is characterized, to at least a first approximation, by multiplying the satellite range measurement (pseudorange) error times the dilution of precision (DOP) satellite geometry factor. Navigational accuracy can be improved by decreasing the DOP or by increasing the accuracy of the pseudorange measurement. In accordance with the present invention, it is the pseudorange errors that are sought to be accounted for.

Pseudorange errors which are common between local receivers are susceptible to differential treatment. The major common error sources which are subject to this differential treatment include selective availability errors, of up to 30 meters; ionospheric delays, varying between 20–30 meters by day and 3–6 meters by night; tropospheric delays, up to 30 meters; ephemeris errors, typically less than 3 meters; and satellite clock errors, typically less than 3 meters. Selective availability errors are caused by deliberate distortion of the GPS signals by the U.S. Government to reduce the inherent accuracy of GPS for security reasons. Ionospheric and tropospheric errors increase as the separation distance between a reference station and a mobile receiver, such as mobile navigational controller 32, increase. However, if the distance between these two stations is less than about 500 miles, the total navigation error due to ionospheric and tropospheric delays can be kept below 5 meters.

Figure 3:
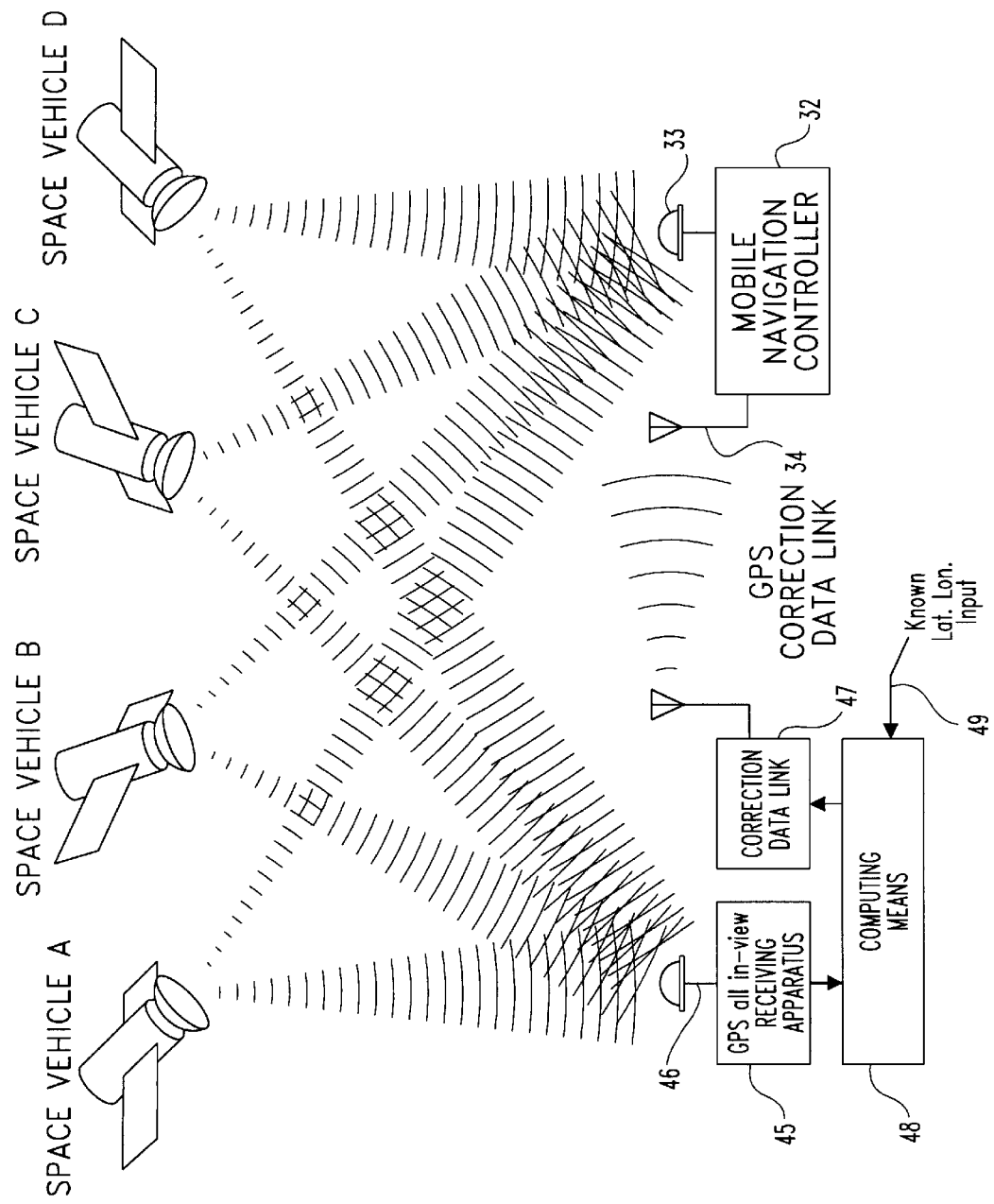
FIG. 3 is a schematic representation of the components of the present invention which implement the differential navigation techniques of the invention.

In order to remove, or at least greatly minimize, the cumulative effect of each of these common sources of pseudorange error, the present invention contemplates a GPS differential reference station, such as station 45 shown in FIG. 3. This station includes a GPS all-in-view receiving apparatus 46, and a correction data link 47 for transmitting corrected positioning data to the mobile navigation controller 32. The GIPS receiving apparatus 46 includes an appropriate antenna for receiving a number of signals transmitted by a Lumber of orbiting space vehicles, such as satellites A–D. The antenna 46 can be similar to the GPS data receiver 33 connected to the mobile navigation controller 32. The correction data link 47 includes a transmitter capable of transmitting at a nominal range of 500 miles to the correction data receiver 34 on the mobile navigator control 32.

The differential reference station also includes a computing means, or computer 48, which is used to perform the GPS differential reference calculations. The location of the GPS reference station 45 is carefully surveyed to determine its phase center position. The known latitude and longitude of the station is input at 49 to the computing means 48. This known lat-lon is then used to calculate the GPS pseudorange error. The computing means includes software means for interpreting, latitude, longitude and altitude information received by the GPS receiving apparatus 46 from each of the number of satellites A–D. In particular, the computing means 48 compares the lat-lon information based on the signals from the space vehicles with the known lat-lon of the reference station. A correction value is computed which is then communicated continuously and in real-time through the data link 47 to the correction data receiver 34 on the mobile navigation controller 32.

A preferred reference station receiver is a multi-channel "all-in-view" receiver with one channel assigned to each visible satellite. With currently-planned satellite constellations of about 21 satellites, about eight satellites are in view at any given time. Thus, an eight-channel receiver is desirable. The computing means 48 performs the aforementioned pseudorange error calculations for each satellite in view. A correction value for every in view satellite is then transmitted across data link 47 to the mobile navigation controller 32 to be used in a manner described below.

Figure 4:
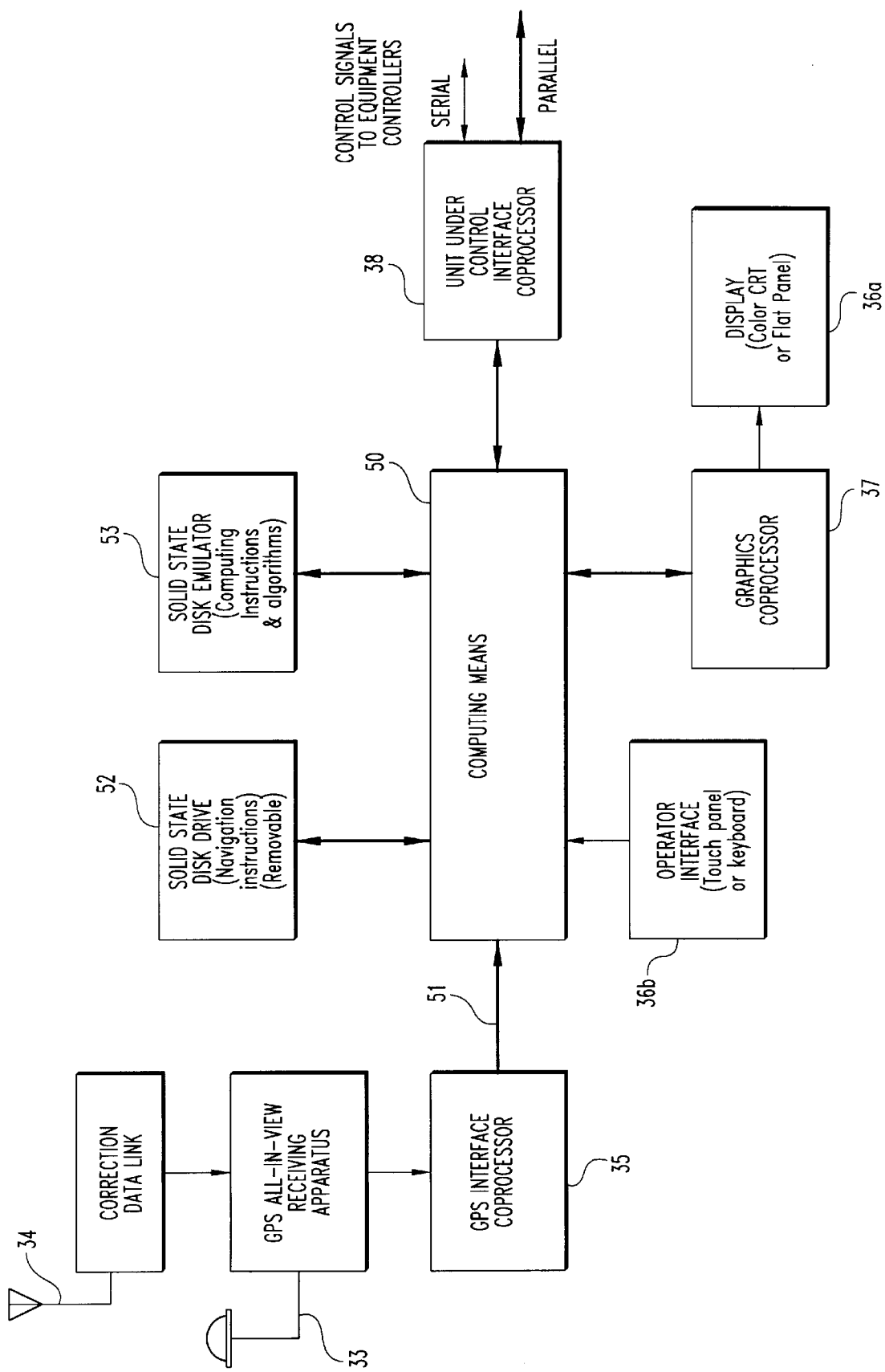
FIG. 4 is a block diagram depicting the basic components of the apparatus of the present invention.

Referring now to FIG. 4, a block diagram of the system controller 30 is shown. The system controller 30 as previously described includes a correction data link receiver 34 and a GPS data receiver 33. The GPS receiving apparatus 33 can be substantially similar to the reference station receiving apparatus 46, although the receiving apparatus for the mobile unit need not have the same number of channels for the multi-channel receiver. Preferably, the GPS receiving apparatus 33 is a four or more channel receiver for receiving GPS data from at least four space vehicles A–D to provide sufficient latitude, longitude and altitude information. The GPS receiver 33 of the system control 30 of the UUC is equipped with circuitry to accept correction data from the correction data link 34. The GPS receiving apparatus 33 includes software to select appropriate ones of the satellite signals received by the mobile navigation controller 32. This software selects from the all-in-view satellites available to the mobile GPS receiving apparatus 33, which selection is limited to those satellites for which pseudorange correction data has been received from the reference station 45. The GPS receiving apparatus 33 then integrates this correction data with the GPS position data received from the selected satellites to produce corrected and accurate real-time position information for the UUC.

This corrected lat-lon data is then fed to a GPS interface coprocessor 35 which sorts the wide variety of information and messages from the GPS receiver and stores this information in addressable locations so that the computing means 50 of the system controller 30 can access the information in a rapid manner over a parallel data bus 51. The information supplied over the data bus 51 from the GPS interface coprocessor 35 to the computing means 50 includes the corrected latitude, longitude and altitude of the vehicle, along with the precise time and date, and the speed and track over ground of the UUC. All of this information is available from the GPS system through the receiving apparatus 33 and coprocessor 35.

The system controller 30 includes a central computing means 50, which is preferably a microprocessor-based computer. This computer can be placed in the operator compartment of the UUC to provide environmental protection for the unit. The microprocessor 50 sends and receives information to and from a number of components. A user or operator interface 36 is provided, which is shown in more detail in FIG. 5. The user interface allows the operator to monitor the operation of the navigation system controller as well as to provide instructions to the controller. In the preferred embodiment, the user interface 36 includes a color CRT 36*a* capable of displaying multi-color map information. The interface also includes an input device, which in the preferred embodiment is a touch screen display 36*b*. The touch screen capability is preferred because the operations that would typically be requested by the operator are few in number. Alternatively, a separate keyboard can be provided having only a few keys corresponding to the critical user interface functions. However, the touch screen allows both the user input and the display output to be integrated into a single package. The display screen 36*b* can be controlled by a graphics coprocessor 37 which is connected by a parallel bus to the microprocessor computing means 50.

The system controller 30 further includes a solid-state disk drive 52 and a solid-state disk emulator 53. The solid-state disk drive 52, which preferably uses a removable disk, contains navigation instructions and information concerning the specific UUC tasks. This task and navigation information is loaded prior to operation of the UUG and can be transported to the UUC via a credit-card size removable memory supported by the solid state disk drive 52. The solid state disk drive 52 preferably is a non-mechanical drive which is environmentally sealed to avoid contamination as the UUC is operated in the field.

The solid state disk emulator 53 is also a non-mechanical unit. The emulator is not removable from the complete package of the system controller 30, and is preferably enclosed within the housing for the microprocessor 50. The solid state disk emulator 53 contains all of the start-up software for the primary microprocessor computing means 50, such as the operating system, application software, and hardware drivers for peripheral computing boards.

The microprocessor central computing means 50 also interfaces with the product delivery controller 38, or more specifically a UUC interface coprocessor. This interface coprocessor 38 includes serial and parallel data lines for transmission of data to and from various components of the vehicle control electronics, such as controllers $19_{a-f}$. Information can also be sent back to the central computing means 50 for incorporation into a performance record that is recorded on the solid state disk drive.

Figure 6:
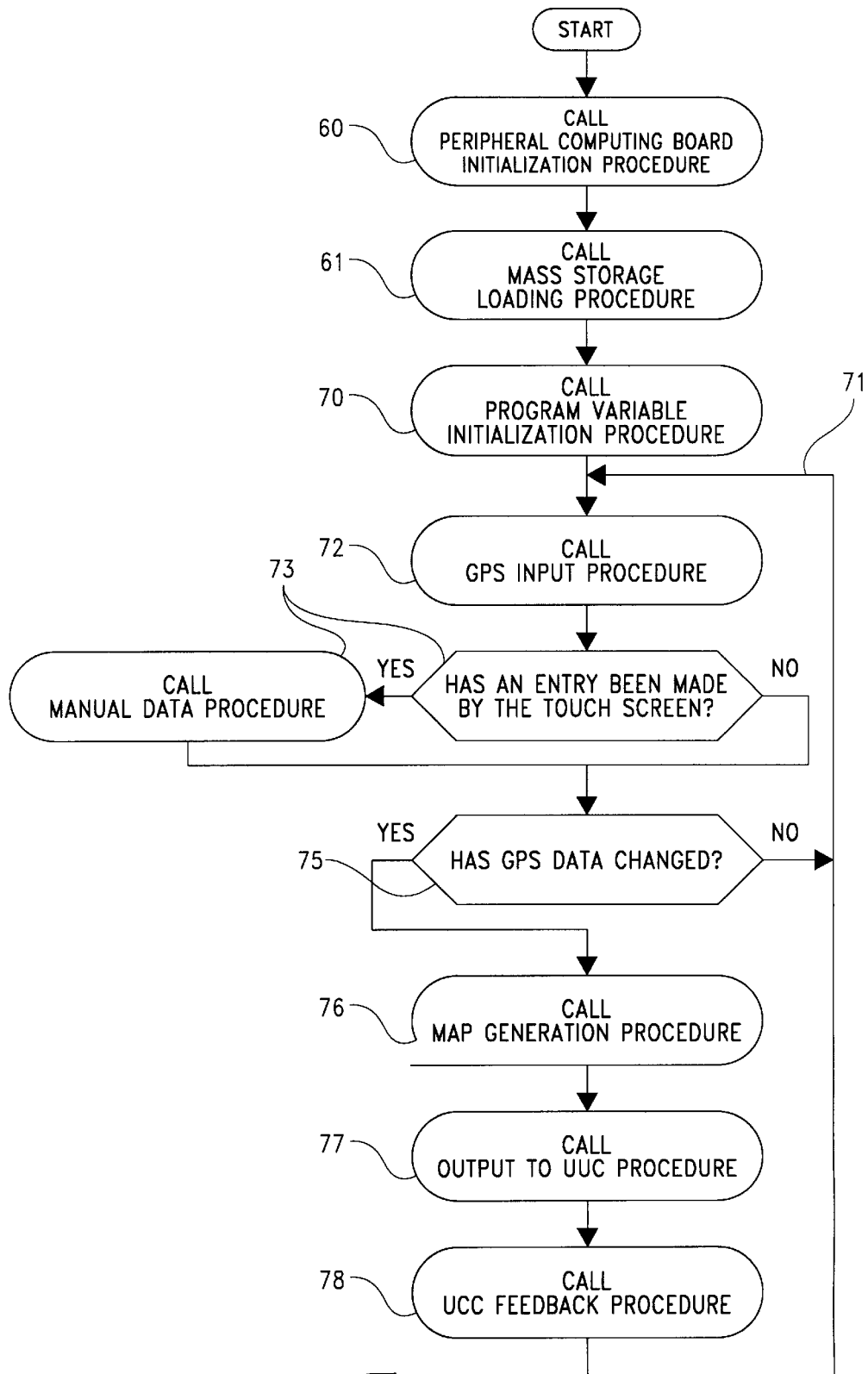
FIG. 6 is a flowchart of the main procedure implemented by software in accordance with the present invention.

The system controller 30, and principally the microprocessor computing means 50, implements a number of resident software routines for performing the navigation said prescription controlling functions. The details of these routines, along with the details of the procedure implemented by the computing means 50, is described herein with reference to the flow charts shown in the figures. Referring first to the basic flow chart shown in FIG. 6, the main procedure is implemented by the microprocessor computing means 50 to control the flow of the program by asserting calls to a number of subroutines. A first subroutine call 60 is to initialize the peripheral computing boards, such as a board for the coprocessor 37, an interfacing controller board for the GPS receiving apparatus 33, and an embedded controller for interfacing as part of the UUC interface coprocessor 38. Program flow proceeds from the computing board initialization procedure subroutine 60 to the mass storage loading procedure subroutine 61. Details of this subroutine 61 are shown in the flow chart of FIG. 7.

In the mass storage loading subroutine 61, data is read from a slower non-volatile memory, such as from the solid state disk drive 52, and transferred to a more readily accessible random access memory (RAM) contained within the microprocessor computing means 50. In the remaining steps of the subroutine 61, specific default data is loaded into RAM which corresponds to various performance and map display information essential to the operation of the system controller 30. In the first step of the subroutine, a default map scale value is loaded in step 61*a*. This value represents a coefficient by which the size of the map displayed on the user interface display 36*a* will be magnified.

Figure 5:
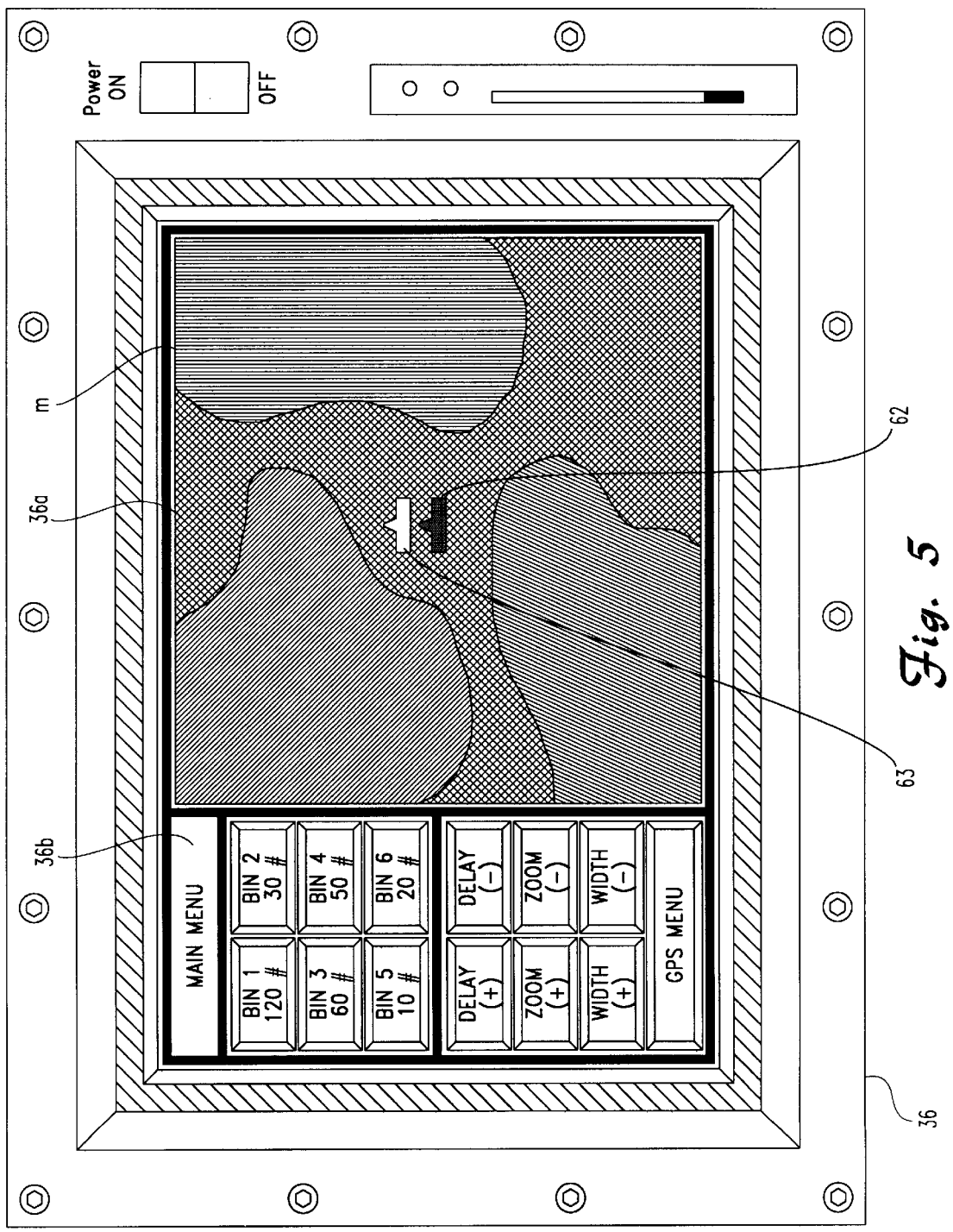
FIG. 5 is a pictorial representation of the( display console used with the apparatus of the invention with a portion of a field map displayed thereon.

A typical map M is shown on the display 36*a* in FIG. 5. In the display, each pixel of the screen represents the smallest discernible increment of information conveyed when the map scale value is at 1.0. If this scale value is increased to some multiple of one, each pixel of the graphics screen will represent a multiple of that particular increment. For example, if the resolution o f the data received from the CPS interface coprocessor 35 is 0.001 minutes (in lat-lon coordinates) and the scale value is 1.0, then each pixel on the display screen 36a represents 0.001 minutes latitude or longitude. However, if the scaling factor is increased to a value if 2.0 for example, each pixel would represent 0.001/2.0 or 0.0005 minutes latitude or longitude. In other words, increasing the map scale value increases the resolution of the display on screen 36a. In the preferred embodiment, the default map scale value is 1.0 so that each pixel on the screen 36a corresponds to the actual resolution of the data received from tile CPS coprocessor 35.

In the next step 6b, a default delay factor is loaded into RAM. This delay factor represents the distance required for the UUC to respond to a change in commands from th e UUC interface coprocessor 38. For instance, if the system controller 30 in implementing a particular prescription determines that a change in the amount of product in bin 11a (see FIG. 2) is required, it is known that product fed from bin 11a at a new feed rate takes a certain amount of time to travel along the conveyor 20 and reach the rotary spreader 15 at the new rate. Thus, this delay factor represents the distance over ground in which it is anticipated that the UUC will be able to respond following a change in commands.

This delay factor is illustrated with reference to FIG. 5. In particular, in the center of the display screen 36a is a pair of rectangular symbols representing the unit under control (UtJC). The lowermost symbol 62 in black corresponds to the present known position of the UUC. The symbol 63 in white represents the predicted position of the UUC as a function of the delay factor, the course over ground and the speed over ground of the UUC. Thus, as the system controller 30 implements the particular prescription, when the predicted position symbol 63 reaches a particular change in prescription, the microprocessor 50 calculates the change in prescription and transmits that information to the appropriate controller in the applicator vehicle 10, with the understanding that the product mixture change will reach the rotary spreader 15 by the time the actual position symbol 62 of the UUC reaches the then current position of the predicted symbol 63.

By way of a specific example, if it is shown that the applicator vehicle 10 requires 5 seconds to activate a change in prescription or change in product mixture, the distance between the two symbols 62 and 63 represents the distance traveled by the UUC at its known current speed over ground over that 5-second time delay. Once the predicted position symbol 63 reaches a location on the map M corresponding to the change in prescription, the system controller 30 generates signals transmitted to the various product controllers on the applicator vehicle so that within that 5-second time delay, the new prescription will have reached the rotary spreader 15. It should be understood that the actual physical distance between the current UUC symbol 62 and the predicted UUC symbol 63 will vary for a fixed known time delay value based upon the actual speed over ground of the vehicle. As the vehicle moves faster, the distance separating the two symbols on the screen 36a will increase, and conversely as the speed decreases.

In the next step 61c of the mass storage subroutine 61, a default value of the operating width of the UUC is entered. This value corresponds to the effective width at which the rotary spreader 15 can dispense the agricultural products from the applicator vehicle. The width of the UUC is represented by the width of the symbols 62 and 63. The graphics coprocessor 37 adjusts the width of the symbol in relation to the scale of the map so that the symbol represents actual coverage over the acreage being treated. In a typical circumstance, the actual effective width of the UUC will vary depending upon the type of agricultural product being applied and the manner in which the product is applied. For instance, the rotary spreader 15 shown in FIG. 2 may be replaced by a single spreader bar of a predetermined width. Moreover, the effective operating width of the UUC may vary as the density of agricultural product to be applied is varied.

With respect to the product density, it is known that certain dry products may vary in compaction ratio due to the ambient humidity. In other words, under higher humidity conditions, the dry product may become more compacted in the UUC hoppers. This higher compaction can lead to an effective product density different from what may have been anticipated. Thus, the present invention further contemplates software that generates a scaled product density value that compensates for the compaction ratio. A default value for the compaction ratio can be entered during the subroutine 61 in which the default value is a known value at standard temperature, atmospheric pressure and humidity.

Figure 7:
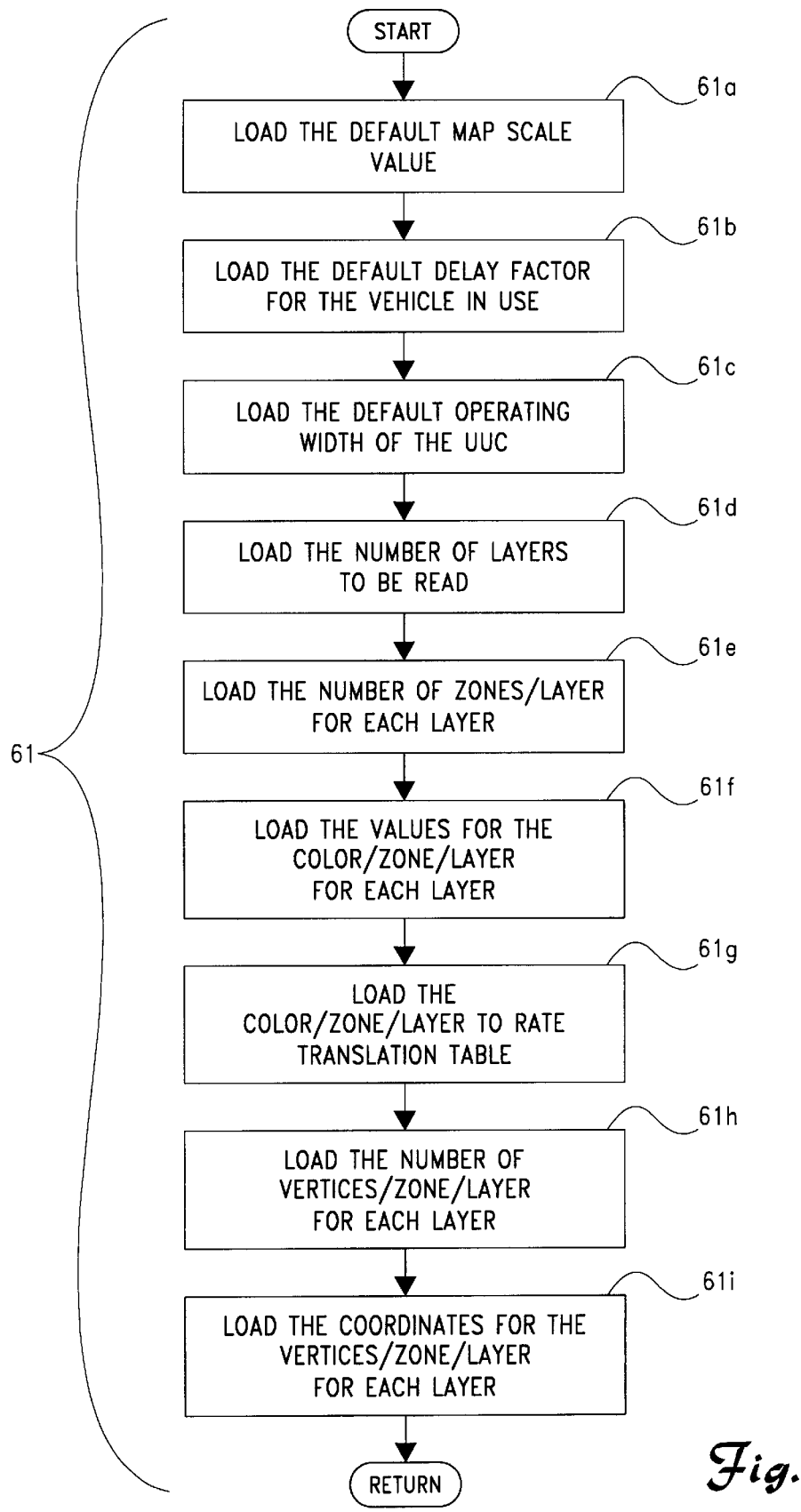
FIG. 7 is a flowchart of the mass storage loading procedure implemented by software in accordance with the present invention.
Figure 8:
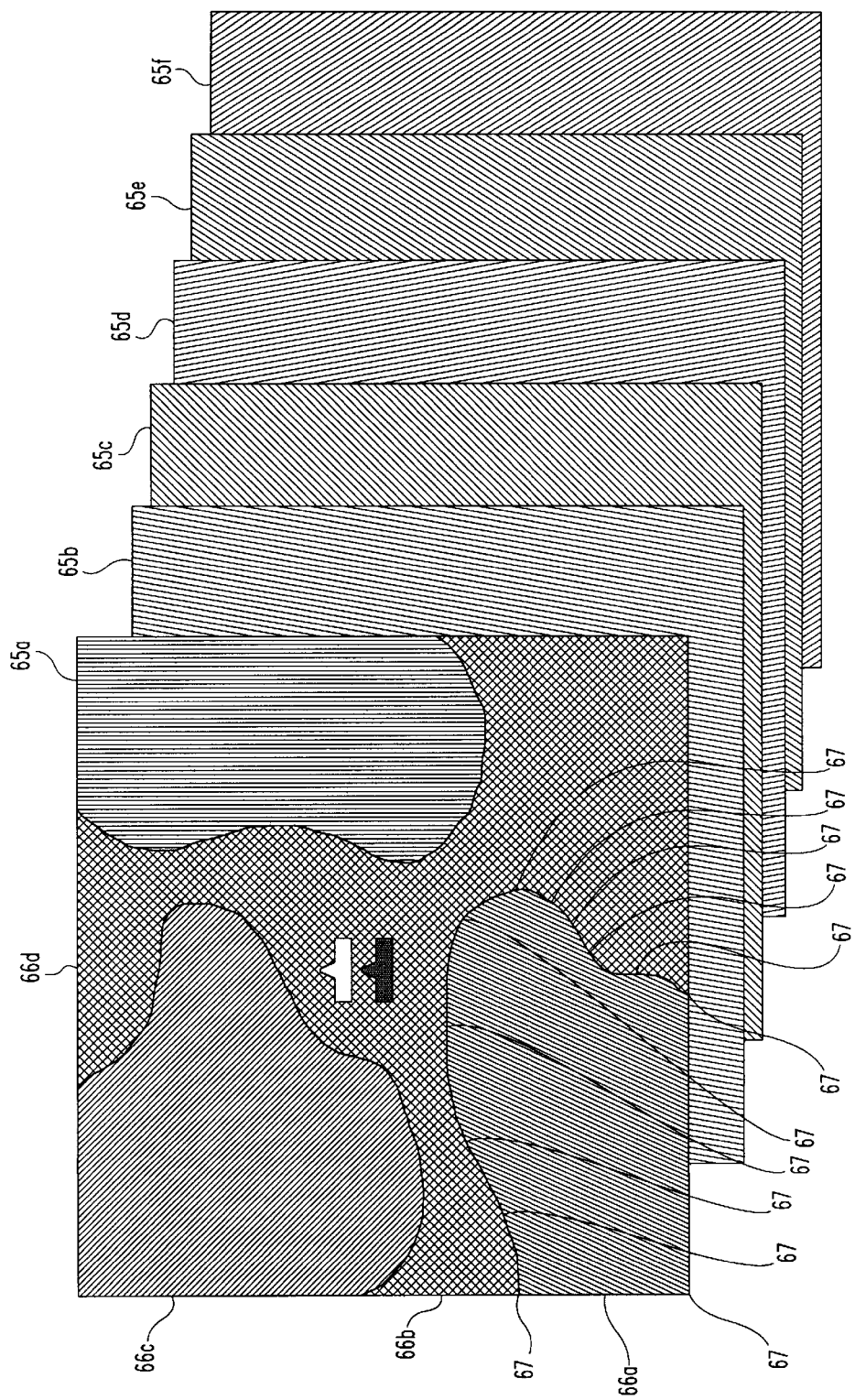
FIG. 8 is a pictorial representation illustrating the multiple layer map protocol implemented by software in accordance with the present invention.

Referring again to FIG. 7, in the next step 61d of the subroutine 61 the number of layers to be read is identified. In accordance with the present invention, the map used by the system controller 30 to implement the agricultural product prescription is represented by a number of layers. Each layer corresponds to the prescription application map for a different product. For instance, in the applicator vehicle 10, if each bin 11a–f, each liquid tank 12a–b and each accessory bin 3a–b is filled with product to be applied to the acreage, then up to ten different products can be applied to the acreage. Each product may have a different prescription for application depending upon the soil content and the crops grown in the soil. Each layer of the map corresponds to a single product dispensing mechanism that is to be controlled by the system controller 30. The preferred embodiment contemplates up to ten layers, of which only six layer maps 65a–65f are shown in FIG. 8. Each layer corresponds to a different agricultural product to be dispensed onto the acreage.

The present invention implements a protocol that makes the most efficient use possible of the limited memory of the system controller on board the UUC. This protocol provides for RAM storage of information required for making a two-dimensional digital drawing of each map layer, without storing the entire map layer represented by thousands of pixels (and therefore bytes) of information. As described more fully herein, only the vertices of a number of zones that comprise a given layer are stored in RAM. Software within the system controller 30 then uses this stored vertices information to "draw" each map layer as that layer is being processed to extract the product prescription information contained therein. Once a layer map has been "drawn" and the prescription information extracted for the global coordinates of the UUC, the layer can be displayed on display 36a. The operator may select a different layer, corresponding to a different product prescription, to be displayed using the touch screen user interface 36b, which layer can be displayed once it has been drawn and processed in accordance with the procedure described more fully herein. Borrowing the parlance of the computer graphics art, as each layer is being processed it is being drawn onto the "active" invisible page. A layer can be called by the UUC operator onto a "non-active" visible page for visual display.

In the next step, 61e of subroutine 61, a related step is performed in which the number of zones per layer is loaded into RAM. Referring to FIG. 8, it can be seen that the layer 65a includes four regions 66a–66d having different colors or shadings. Each of these colors, or more appropriately zones in accordance with the present invention, represents a level of activity to be conveyed to the respective product controller mechanism in the applicator vehicle 10. Reference to the level of activity simply means the quantity or rate of feed of the particular agricultural product to the rotary spreader 15. Thus, zone 66a may correspond to a product feed rate of 5 units per acre, while the next adjacent zone 66b may represent a feed rate of 10 units per acre. As the UUC from zone to zone, the system controller 30 interprets the information within that zone and sends a corresponding signal to the controllers of the applicator vehicle to effect a change in product feed quantities or feed rates.

Figure 9:
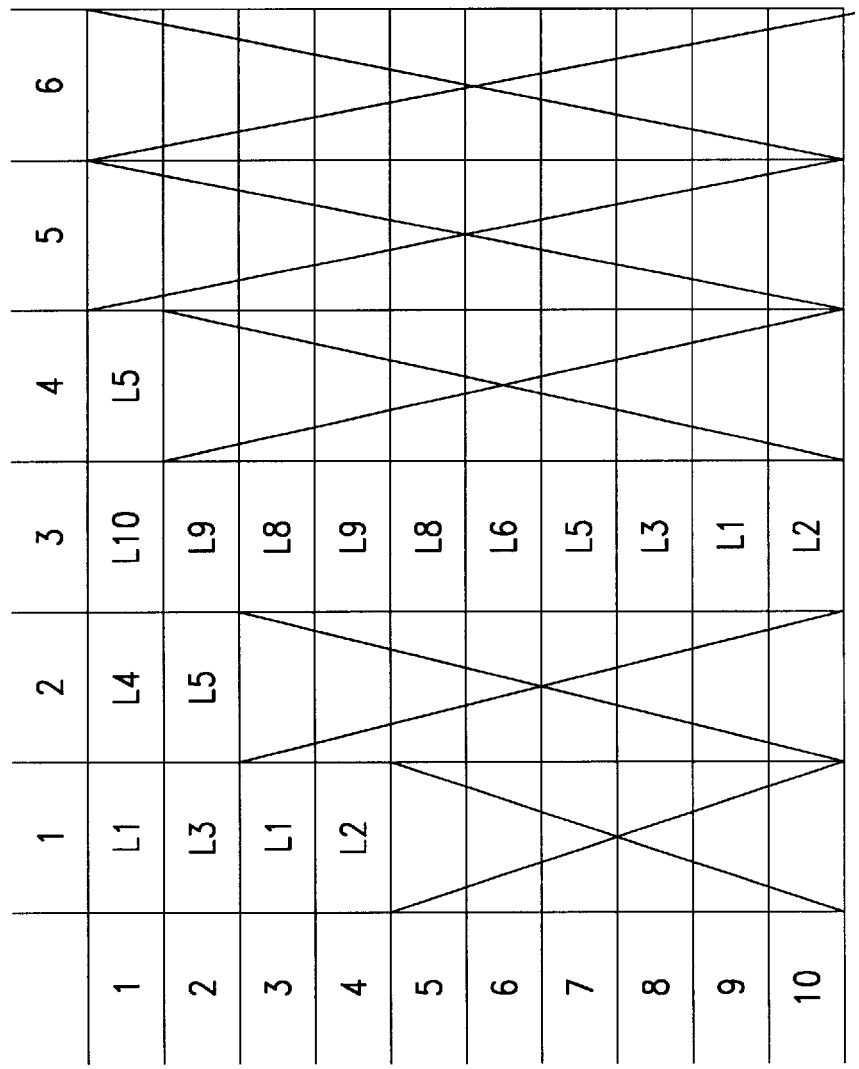
FIG. 9 is a chart illustrating the matrix of map layers and zones implemented by software in accordance with the present invention.

In the preferred embodiment of the invention, up to ten layers having up to fifty zones per layer can be stored in a data base within the system controller RAM. Thus, the steps 61d and 61e produce a two-dimensional matrix of product activity levels as a function of the number of zones and the number of layers. A representative matrix of data stored in the RAM is shown in FIG. 9. For simplicity, only six of the ten possible layers (corresponding to the six product bins 11a–11f shown in FIG. 1) and ten of the fifty possible zones are represented. The levels of activity for each of the products are represented by L1–L10, with L1 corresponding to the lowest level of activity and L10 corresponding to the highest. Columns of the matrix represent the products to be dispensed. In this instance only four products are dispensed, so that the columns of the matrix corresponding to the fifth and sixth layers, or products, are empty. Each row of the matrix corresponds to the number of zones representing the levels of activities for each product. Again, as with the map layers, not all zones need be filled with data and represented on the digital map. For example, for the first product only four activity zones are identified, which corresponds to the four zones 66a–66d for layer 65a shown in FIG. 8. It can be seen that in the first zone, the level of activity is at the lowest level L1, but the activity increases to level L3 in the next zone. Likewise, the second layer corresponding to a second product includes only two levels of activity and consequently only two zones are represented on its corresponding map 65b in FIG. 8. The third product, represented by a third layer of the map, includes levels of activity in each of the ten zones which vary between each zone.

Referring back to FIG. 7, in the next step 61f of the subroutine 61 values are loaded into RAM corresponding to the colors assigned to each zone within each layer. It is understood that the nomenclature "color" is not necessarily intended to be used in a visual or graphic sense. Instead, identification of different colors for each zone within a layer is intended to suggest a protocol for representing universal levels of activity. In other words, referring back to FIG. 9, the lowest level of activity for product 1, L1, may not be the same as the lowest level of activity for product 3. For instance, it ran be contemplated the product 1 may normally be spread or dispensed at 10 levels ranging from 1 unit per acre to 10 units per acre, while a second product may range in activity level from 50 units per acre to 140 units per acre. The data stored in the RAM matrix depicted in FIG. 9 represents control data fed to the various product dispensing controllers. Consequently, a universal scheme is required for representing actual levels of activity for the different products being dispensed. In the present invention, this universal scheme is implemented by assigning different "colors" to each zone of each layer. For example, the lowest level of activity for product 1 can be represented by the color green while the lowest level of activity for product 3 can be represented by the color red. (Again, it is understood that the computer does not understand the physical sense of color.) The term "color" is used as a shorthand notation to add a third dimension to the matrix of FIG. 9. However, similar colors can be used to represent the same levels of activity between layers. Likewise, the same colors can be used to correspond to different levels of activity across different product layers.

Thus, in step 61f of the subroutine 61, the values for the color for each zone for each layer are loaded into RAM. In the preferred embodiment, up to ten colors are utilized. In the next step 61g, a translation table is also loaded into RAM which correlates a particular color corresponding to a zone in a given layer, to a specific output magnitude provided to the product controllers in the UUC or applicator vehicle 10. This translation table operates simply as a look-up table once the microprocessor computing means 50 has extracted a particular color from the layer/zone matrix in RAM. In order to interface with 16-bit product delivery controllers, each value in the translation table can be a 16 bit value.

The last two steps 61h and 61i of the subroutine 61 concern the representation of the different zones in each layer of the map. In the first step, the number of vertices per zone per layer are loaded into RAM. In accordance with the present invention, each zone is defined as the area within a polygon. The complexity of that polygon can vary as a function of the number of vertices. For example, referring again to FIG. 8, the zone 66a of the first layer 65a of the map can be defined by a number of vertices 67. The vertices define the contour of the zone 66a. It is understood, of course, that the greater degree of convolution or curvature of the perimeter of the zone polygon determines the number of vertices necessary to define the polygon. In addition, the amount of curvature is limited by the resolution of the navigation information, or lat-lon data, available to the system controller 30. In step 61i, the actual latitude-longitude coordinates for each of the vertices 67 is defined for each zone and for each layer. The amount of storage required for the data loaded in step 61h and 61i depends upon the degree of lat-lon resolution available from the GPS system and the amount of convolutions of the polygon representing the various zones in each layer.

Returning again to FIG. 6, following completion of the mass storage loading procedure, control of the main procedure routine passes to the program variable and its initialization subroutine of step 70. In this step all global variables and graphics parameters are given initial values. The global variables include variables which are used by all the procedures. The graphic parameters include values corresponding to which layer of the map is to be active and which is to be displayed. In addition, any modifiable look-up tables are also initialized.

Thus far, all the subroutines of the main procedure have been to initialize the routines of the system controller 30 in preparation for real-time operation of the navigation control and prescription dispensing features of the invention. The real-time operation of the software in the system controller 30 performs a number of functions in a procedure loop 71. In the first step of the procedure loop, step 72, the GPS interface coprocessor 35 (FIG. 4) is interrogated by the microprocessor computing means 50. In this subroutine 72, detailed or non-detailed GPS information is transmitted from the coprocessor into operating RAM within the microprocessor computing means 50 for use by the remaining procedures. Information obtained from the interface coprocessor (which information is obtained upstream from the GPS system itself) can include information concerning the status of the GPS satellites, the position of the mobile unit under control, and speed and heading data. The status information can include messages concerning the status of the receiver 33, the number of satellites visible and the number of satellites being tracked by the mobile navigation controller 32. The status information can also include the real time since the last navigation procedure was performed by the system controller 30.

The position information can include the GPS time, latitude, longitude, altitude and position source information. The speed and heading data can include information concerning the course over ground as well as the speed over ground of the UUC 10. The data provided from the GPS interface coprocessor 35 to the microprocessor computing means 50 can be viewed by the operator of the UUC as desired or required.

More detailed information, which is also available from the GPS system, can be read by the microprocessor 50 and made available to the operator through the user interface 36. This information includes the status, position and speed/heading data available under the normal non-detailed GPS interrogation, as well as several other messages providing more detailed information concerning the GPS satellite system itself. This information can include the dilution messages concerning the dilution of precision, mode data, satellite health status and signal strength, position of the satellites, software configuration of the GPS receiver and time recovery results. Selection of the non-detailed GPS status information speeds up the throughput through the system controller 30. However, there may be instances when more detailed information concerning the GPS system and satellites would be desired. If this is the case, the GPS input procedure 72 provides means for requesting detailed information that has already been stored in the GPS interface coprocessor 35 and transmitting this information to the central microprocessor computing means 50.

Once the current GPS data has been stored within RAM in the microprocessor 50, the operator interface is interrogated to determine whether a manual data entry has been made. In the case of a touch screen, the touch screen is interrogated to determine whether the screen has been touched at valid coordinates defined by a specific menu table. If so, then the display on the screen is changed to the particular menu and that menu is made the active menu for further user input. Once a specific function has been called out by the user on the touch screen, that function is performed by the microprocessor 50 according to software associated with that function.

The next step of the main procedure is a decision block 75 in which it is determined whether the GPS data received in the GPS input procedure 72 has changed from the data received in the previous pass through loop 71. In other words, the main procedure implemented by the microprocessor 50 looks to see whether the UUC has moved—that is if its latitude and longitude has changed. If the data has changed, or if the UUC has moved since the GPS coprocessor was last interrogated, the map generation procedure of subroutine 76 is called to produce the digital map representing the current location of the UUC with respect to the various prescription layers.

Figure 10:
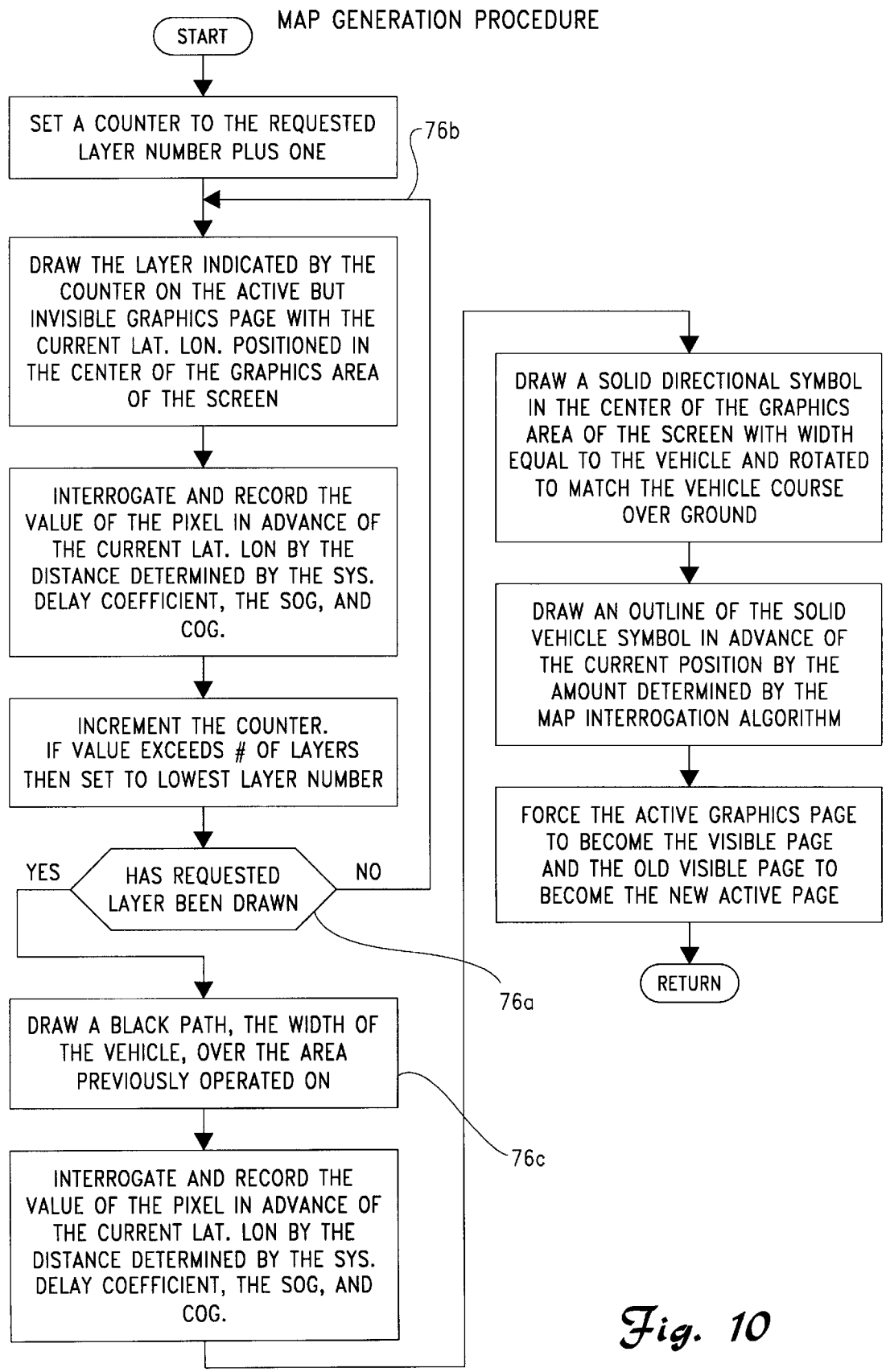
FIG. 10 is flowchart of the map generation procedure implemented by software in accordance with the present invention.

Details of the map generation procedure 76 are shown in FIG. 10. During this map generation procedure, the microprocessor computing means 50 "draws" each layer of the map and interrogates each layer to extract the required information from the layer. In accordance with the present invention it is understood that when the computing means 50 "draws" a layer it reads the vertices information for that layer to determine the location of the several zones of the layer, and then assigns each pixel of the layer map to an appropriate zone based upon its location within the layer map. A layer map being interrogated in a step of the map generation procedure 76 is drawn onto the "active" invisible page in graphics RAM and is referred to as the active layer. The layer being displayed for viewing by the UUC operator is maintained on an "inactive" visible page of the graphics RAM. Software within the graphics coprocessor conducts a "page flip" to switch the inactive visible page with the active invisible page to allow interrogation of the layer previously displayed to the UUC operator.

At the beginning of the map generation procedure, a counter is set to one greater than the value of the layer that has been requested by the operator as the layer to be displayed. The remaining layers of the prescription map will be sequentially processed and interrogated. She counter is incremented through each of the number of layers and is reduced to the lowest numbered layer if it exceeds the stored value for the maximum number of layers to be processed. Once the counter cycles to the user requested layer and that layer is processed, control is passed out of the layer interrogation and processing loop.

After the layer counter is initialized or incremented, the software within computing means 50 draws the layer indicated by the counter. As previously discussed, the layer is comprised of a multitude of polygons defined by vertices translated from latitude/longitude data to screen coordinates. The center of the screen is defined as the location of the UUC or the current GPS coordinates. This drawing step initially takes place in the active invisible page of graphics RAM and is not displayed to the operator.

In the next step of the routine 76, the layer is interrogated to determine the activity levels for the particular component. In particular, the microprocessor 50 interrogates the pixel in advance of the current latitude and longitude by a distance determined by the delay coefficient (corresponding to the default delay factor set in step 61b of FIG. 7), the speed over ground and the course over ground of the UUC as determined by the GPS data. Specifically, the map generation procedure interrogates the pixel directly beneath the predicted position symbol 63 shown on the screen in FIG. 5. The value of this pixel is stored in RAM for subsequent use by the next step of the main procedure in which data is output to the unit under control.

A decision block 76a determines whether all of the layers have been processed and interrogated. If not, control returns by loop 76b to draw and interrogate the next sequential layer. On the other hand, once the counter reaches the number of the user requested layer, control passes from the decision block 76a to the step 76c of the map generation subroutine 76. In this step a black path the width of the vehicle is drawn over the area previously operated upon. More specifically, a new polygon is created which defines the area formed between the last position update and the current position update corresponding to the vehicle coverage width. This solid color denotes that the vehicle has already traveled over that particular location. This solid color, or black, polygon is stored in memory and is displayed on the displayed layer so that the operator can determine regions of the agricultural field that has already been serviced. In the next step, the pixel at the current latitude and longitude is again interrogated and the solid directional symbol corresponding to the present position of the vehicle is drawn at that location. An outline vehicle symbol, such as vehicle symbol 63, is also drawn in advance of the solid symbol corresponding to the projected position of the UUC given the delay factor and the speed over ground.

In the final step of the map generation procedure 76, the active graphics page, or the map layer being operated on by the procedure, is made the visible page displayed on display 36a for viewing by the operator. The previous visible page then becomes the new active page in graphics RAM. When the map generation procedure has been completed, the values of the pixels for each map layer at the predicted position of the UUC (icon symbol 63 in FIG. 5) are stored in RAM waiting to be transmitted to the UUC interface coprocessor.

At this point, control is then returned to the main procedure in which the next step 77 is executed to output control information to the UUC interface coprocessor 38. In this procedure 77, the last interrogated pixel is reviewed to determine whether it is black or has a different color. If it is not black, then the particular color or output value specified by the color is passed to the translation table defined in step 61g (FIG. 7). If that pixel's color is black, the color has been changed to black in a previous path through the loop 71 because the UUC has already traveled over that particular location. In this instance, a predetermined value, such as a null or zero (0) value, is substituted for the previous value of the pixels interrogated for each layer. An appropriate control signal is then extracted from that translation table and passed to the unit under control through the UUC coprocessor 38. In the case of a null or zero value, the control signal obtained from the translation table can signify an inactive state for the several product distributors.

In the final step of the map generation procedure loop step 78, feedback is received from the UUC. This feedback can include information concerning the performance of the various product distributors of this printing vehicle 10. This information can then be recorded onto a mass storage device as a record of the events which have occurred during the course of operation of the UUC. In addition, the current position, course and speed of the UUC can be stored as a further record of events. Following this feedback procedure 78, control is passed through loop 71 back up to the GPS input procedure 72 to update the current position of the UUC.

The map generation procedure 76 implemented by the microprocessor 50 as well as the graphics coprocessor 37 cooperate to provide several map features that are beneficial and useful to the operator. For instance, the present invention contemplates a moving map display, such as depicted in FIG. 11. In FIG. 11, the map position at two instants of time is depicted. At the first time, time 1 on the left side of FIG. 11, the entire field map is shown with only a part of the map being actually displayed on the screen. It is understood that the entire field map could be displayed on the screen if the display field was increased in size using a zoom capability. However, the normal size of an agricultural field would be too large to fit in a single display and still have a meaningful display for the operator. Thus, as shown in the figure at time 1, only a portion of any prescription map will be displayed on the screen 36a. At a later instant in time, time 2, it can be seen that the entire map has shifted down in the screen relative to the symbol 62 for the vehicle.

Two additional features of the present invention are depicted in FIG. 11. First, a black strip 79 can be seen trailing each of the UUC symbols 62. As discussed with respect to the map generation procedure subroutine (FIG. 10), the black strip represents previously covered area of the agricultural tract. As can be seen in the updated map at time 2, the black strip extends beyond the portion of the map actually displayed. This is an indication that the microprocessor 50 maintains a "picture" of the map in RAM, which picture will include designation of the color black for the pixels previously covered by the path of the UUC.

Another feature of the invention concerns the manner in which each of the pixels within a given polygon are colored either on the screen or in internal memory. In previous devices, such as the device in the Soilteq U.S. Pat. No. 4,630,773 discussed above, each pixel of a given map is assigned a specific value and retains that value throughout an entire operation of the applicator vehicle. Thus, as the map is translated or rotated on the display, or as the vehicle or UUC travels in a path over the map in memory, each pixel must be treated separately, either rotated or translated. This feature of the prior art devices makes the map generation and operation procedures extremely cumbersonme because every pixel must be accounted for at every step of the procedure. Not only is this prior approach very memory intensive (a 250×250 array of pixels will include 62,500 pixels) but any moving map function is very slow and generally incapable of the quick response expected by the operator of the UUC.

To alleviate these problems of the prior art, the present invention uses the polygon approach to defining areas in its moving maps. As previously discussed, in this polygon approach, specific treatment areas are defined simply by vertices of a polygon. As a polygon on the moving map is translated or rotated, only the vertices are moved. Once the polygon has been moved to its current position, each of the pixels within the polygon is assigned the appropriate color associated with the particular polygon or treatment zone. The translation and rotation of the polygons or zones of the map is illustrated in FIGS. 12a and 12b.

Figure 12A:
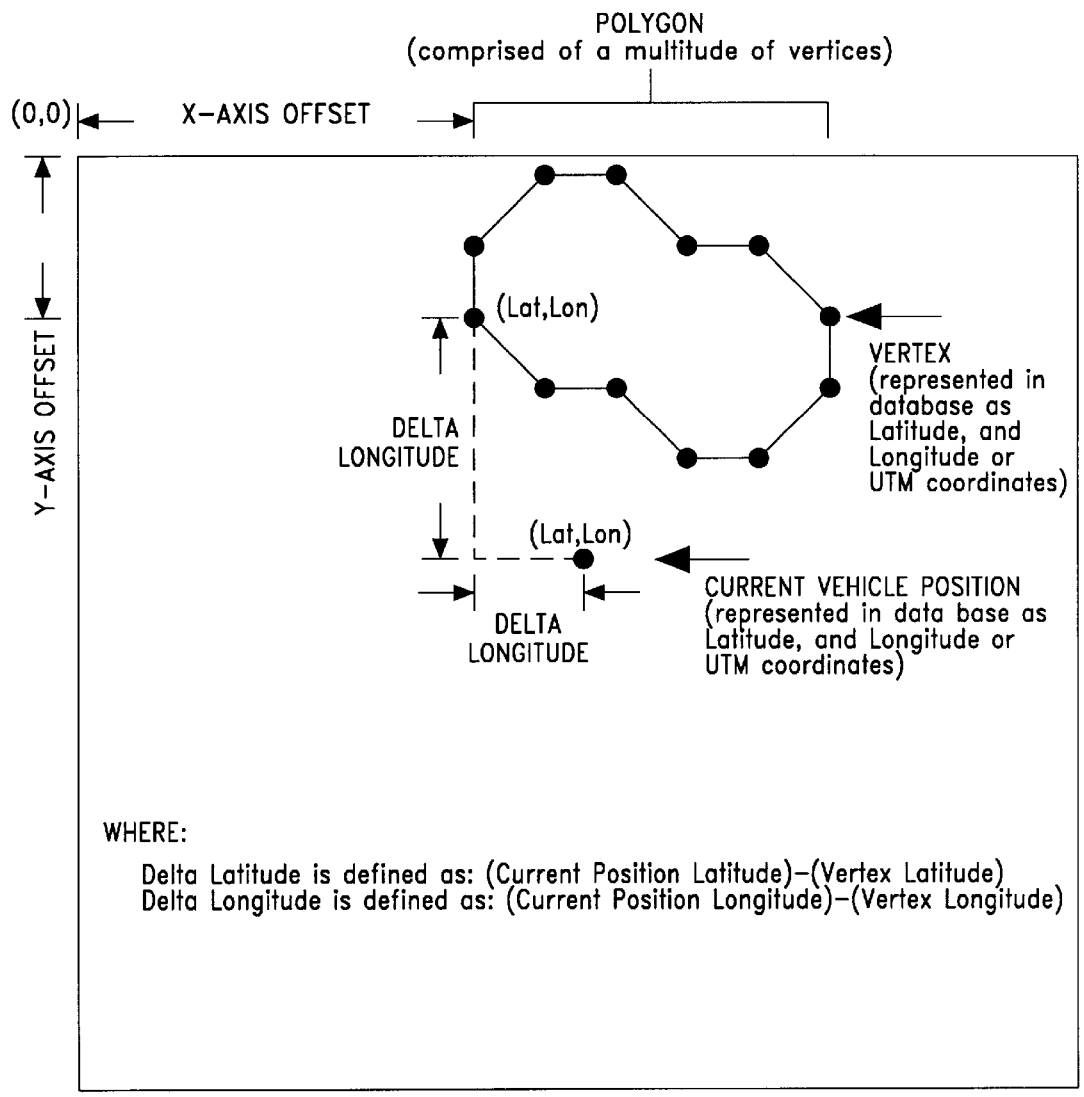
FIG. 12a is a graphical depiction of the protocol implemented by software for translating polygons representing zones within a map layer.

In the first figure, FIG. 12A, the polygon is translated while maintaining or UUC's current position in the center of the screen. According to the translation algorithm, the difference in actual latitude and longitude between the current position of the UUC and the fixed latitude and longitude of the vertex is determined. These delta latitude and longitude values are converted into the number of screen pixels that these distances would be represented by were they to be displayed on the screen. Tie delta pixel values are then multiplied by a scaling value in order to increase or decrease the resolution of the system, and therefore the display, as required. With the scaled delta pixel (delta latitude and longitude) values, these values are added to an offset value which defines the physical center of the screen based upon the particular resolution of the screen. For instance, if the screen resolution is 640×480 pixels, as in the preferred embodiment, then an offset of 320×240 pixels would locate the center of the screen. The scaled delta pixel values are then measured from that zero point to properly locate the vertex, and consequently the fully formed polygon at its new location on the screen.

Figure 12B:
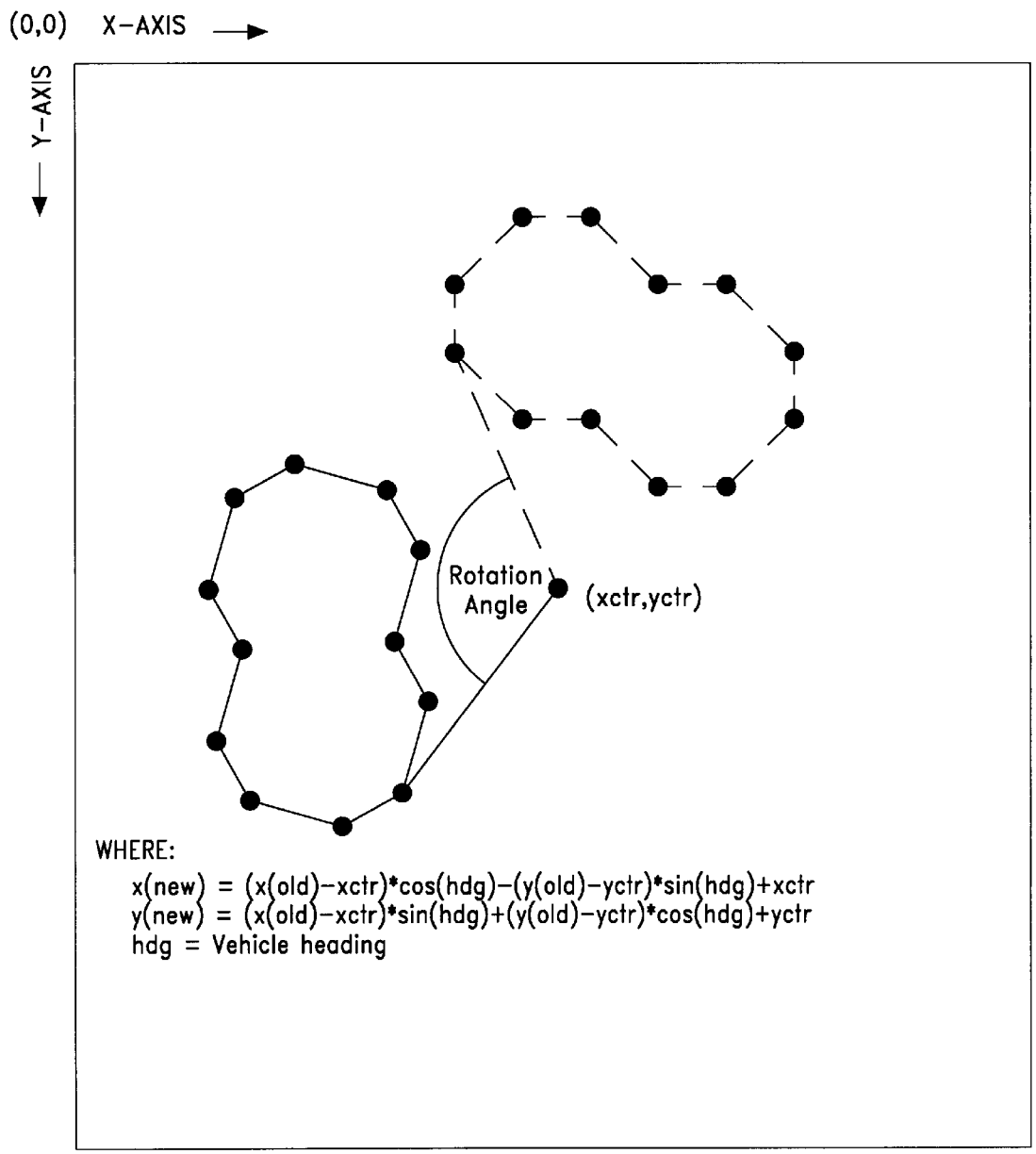
FIG. 12b is a graphical depiction of the protocol implemented by software for rotating polygons representing zones within a map layer.

The rotation of a polygon, or prescription zone, is accomplished in accordance with the procedure illustrated in FIG. 12B. Once the polygon has been translated (or panned), it can be rotated about the center of the screen position at which the UUC symbol is drawn. In order to ascertain the proper rotation, the vehicle heading is ascertained from the GPS data provided to the microprocessor 50 by the GPS interface coprocessor 35. This heading represents an angle of rotation about the center of the graphics screen. The new X and Y positions of the vertices, as defined in pixels on the graphics screen, can be calculated according to the following equations:

$$x(\text{new}) = (x(\text{old}) - xctr)^* \cos(hdg) - (y(\text{old}) - yctr)^* \sin(hdg) + xctr$$

$$y(\text{new}) = (x(\text{old}) - xctr)^* \sin(hdg) + (y(\text{old}) - yctr)^* \cos(hdg) + yctr$$

where "hdg" is the vehicle heading, "xctr" and "yctr" are the physical locations in the center of the graphics screen and "x(old)" and "y(old)" are the original positions of the particular vertex on the graphics screen.

Application of these two equations results in the calculation of new X and Y locations for the vertex on the graphics screen. Each vertex is rotated in the same manner and once all the vertices have been rotated, the pixels are filled in with the appropriate color defined by the specific polygon/zone. The rotation of these particular polygons or zones of a map is typically done in order to keep the vehicle symbol pointing upward in the same direction on the screen. However, if it is desired by the operator, the vehicle symbol itself can be rotated while the remainder of the map is simply translated as the vehicle moves through the agricultural field. The same polygon rotational algorithm described above can be used to rotate the polygon used as a symbol to represent the UUC. This particular feature may be beneficial if the operator desires to maintain a specific compass orientation for the screen display.

Figure 13B:
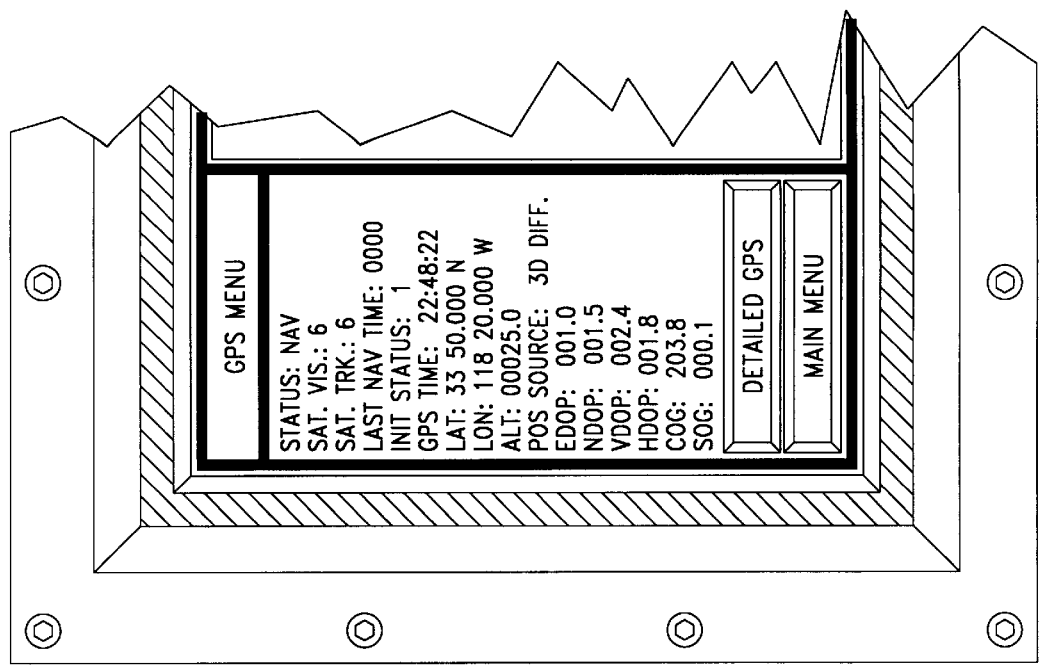
FIGS. 13a and 13b are pictorial representations of two menus displayed on the display console and generated by software in accordance with the present invention.
Figure 13A:
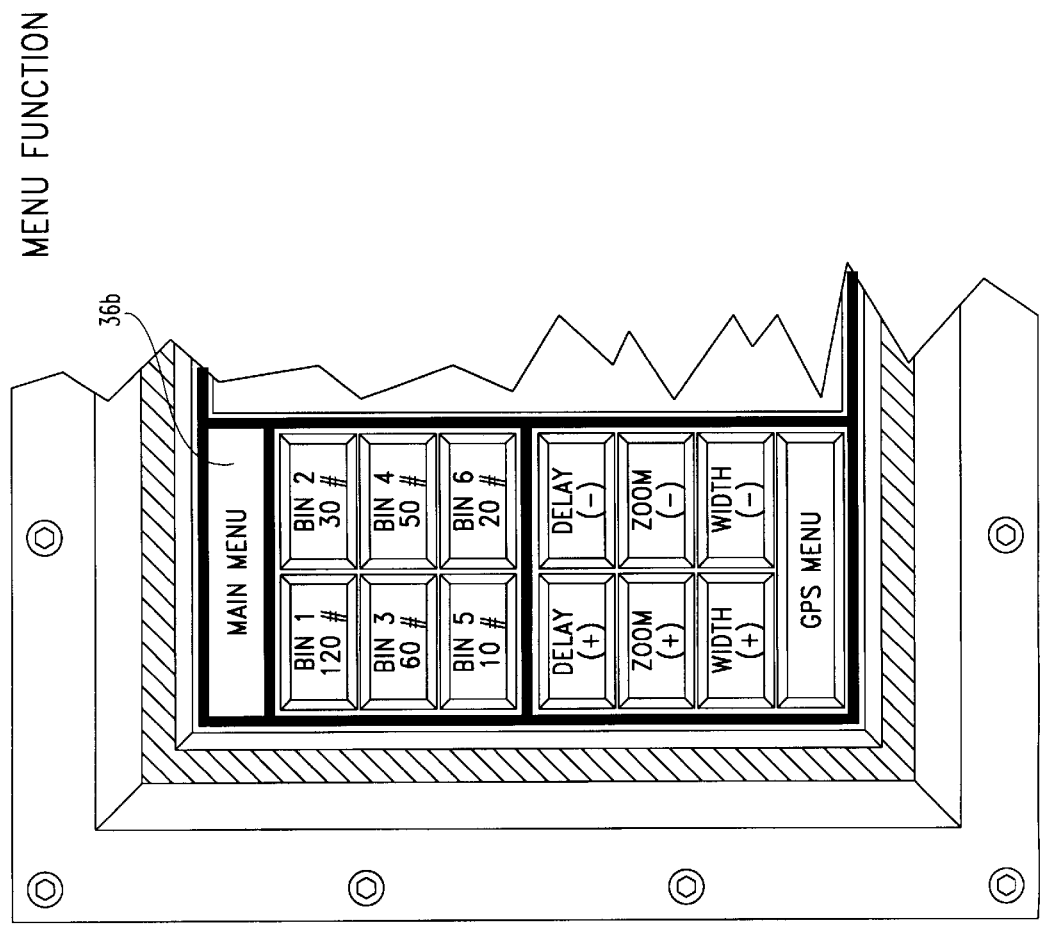

As discussed above, the user interface 36 includes a touch screen user input portion 36b. The details of one specific embodiment of the touch screen are shown in FIGS. 13A and 13B. In FIG. 13A, a typical touch screen display is shown which includes features for changing the width of the UUC symbol, and changing the magnification of the actual display shown on the screen. In addition, delay buttons allow the operator to deliberately change the delay factor as represented by the distance between the actual position symbol 62 and the predicted position symbol 63. A number of screen switch positions correspond to each of the six bins of product that can be serviced by the present invention. The operator can call up the particular layer of map corresponding to one of the six bins shown on the screen. Finally, the bottom bar on the particular display in FIG. 13A allows the operator to access a second menu for displaying the GPS data. The second menu is shown in FIG. 13B. The touch screen feature of the user interface 36 provides a relatively simple means for the operator to control the operation of the system controller 30 and obtain up-to-date real time information concerning the performance of the entire system.

Figure 14A:
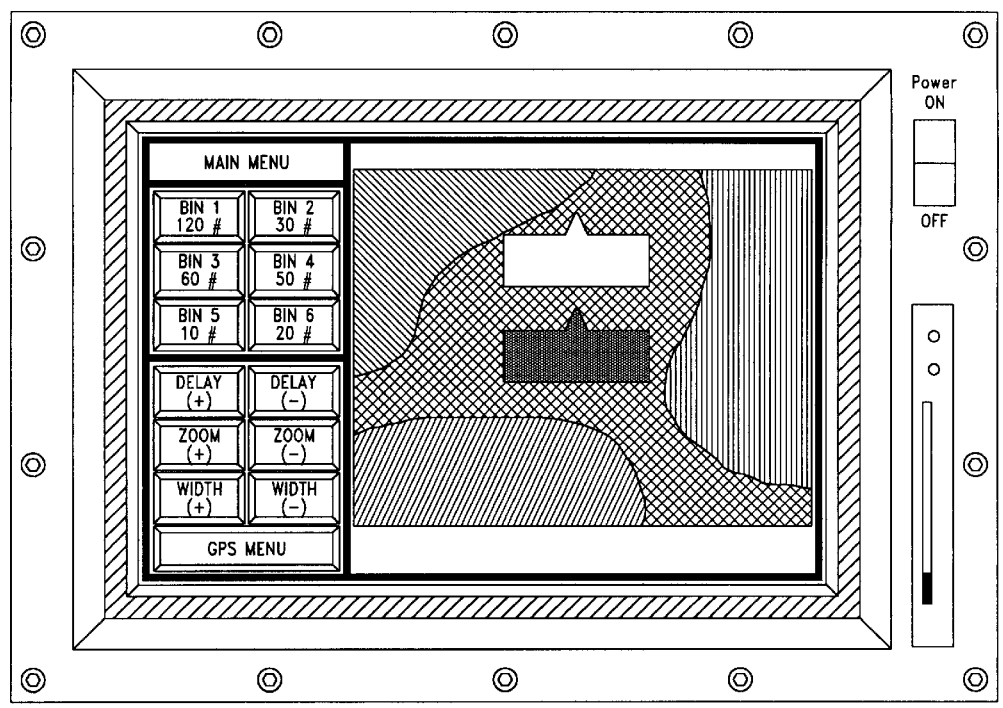
FIG. 14a is a pictorial representation of a map display on the display console illustrating the zoom feature implemented by the software of the present invention.
Figure 14B:
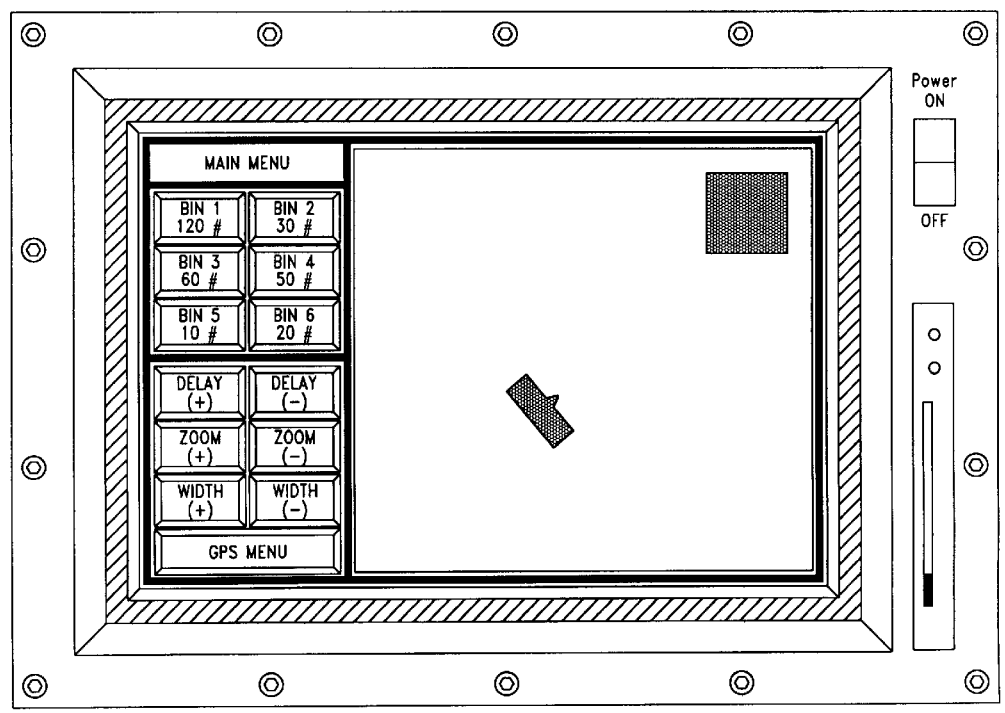
FIG. 14b is a pictorial representation of a map display on the display console illustrating a feature implemented by software of the present invention which permits navigation to a field to be farmed.

FIG. 14A shows the zoom capability of the present invention assuming the operator has pressed the zoom (+) symbol on the touch screen display of FIG. 13A, it can be seen that with the zoom capability, the size of the UUC symbol is also increased because the actual operating width of the UUC assumes a greater portion of the region of the agricultural field displayed on the screen. In FIG. 14B, the feature previously described in which the UUC symbol is rotated is depicted. In this display, the UUC is shown heading toward the agricultural field in the upper right corner of the display. This provides a visual navigation feature for the operator as he drives the applicator vehicle from the storage facility to the acreage to be farmed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

While the preferred embodiment of the present invention concerns a method and apparatus for controlling an applicator vehicle for prescription farming, the invention contemplates application in other fields and endeavors. The method and apparatus can be implemented on an apparatus having a number of functional components, each capable of controllable levels or manners of activity. Control of the activity of these functional components can be based upon the geographic position of the apparatus. For example, method and apparatus in accordance with the present invention can be implemented on a crop spraying airplane. The present invention can also have application in controlling digging and tunneling apparatus where the level and manner of activity of the functional components can be based upon different soil or rock compositions at different geographic locations.

What is claimed is:

1. A prescription farming control system for use in controlling product delivery mechanisms mounted on an applicator vehicle, the delivery mechanisms operable to deliver product to spreader mechanisms for spreading products over an agricultural field, each of the product delivery mechanisms having a device controller which controls the rate of operation of the corresponding delivery mechanism in response to a control signal derived in accordance with a prescription for the field, the control system comprising:

means for storing in a digital memory information defining a digital map representative of the prescription for the field, the map being defined by a number of layers, each layer corresponding to one of the product delivery mechanisms, and each layer including a number of zones, each zone corresponding to a rate of application of the corresponding product in accordance with the prescription for the field at a plurality of global positions within the zone;

means for storing a data table containing control signal values for each of said number of zones in each of said number of layers, said control signal values being indicative of the rate of application of the product associated with a corresponding layer at positions of the vehicle within a corresponding zone;

navigation means for determining the current position of the applicator vehicle on the agricultural field in global coordinates as the vehicle moves over the field; and means for transmitting, to each device controller, selected ones of said control signal values corresponding to said zone of each layer for which the determined current position of the vehicle corresponds to one of said plurality of global positions within the zone.

2. The prescription farming control system of claim 1, wherein said navigation means includes:

a first receiver mounted on the applicator vehicle for receiving positioning data from a number of global positioning system (GPS) satellites;

a second receiver mounted on the applicator vehicle for receiving pseudorange correction data from a fixed position ground station; and means for operating on said positioning data and said pseudorange correction data to generate corrected global coordinates for the current position of the applicator vehicle.

3. The prescription farming control system of claim 2, wherein:

said first receiver is an all-in-view receiver;
said fixed position ground station includes:
an third all-in-view receiver; and
means for calculating pseudorange correction data for all satellites in view of said third receiver; and
said means for operating includes means for selecting position data from several of all satellites in view of said first receiver for which pseudorange correction data is received from said ground station.

4. The prescription farming control system of claim 1, wherein:
said means for storing information includes information corresponding to the global position of plurality of vertices, said plurality of vertices defining said number of zones for each layer; and
said means for transmitting includes;
graphics processor means having a graphics memory and means for digitally drawing each of said layers sequentially in said graphics memory by assigning a plurality of pixels to each of said number of zones within each sequential layer;
means for interrogating the one of said plurality of pixels in each layer corresponding to the current position of the vehicle to determine the zone to which said one pixel is assigned; and
means for reading said data table to obtain a control signal value corresponding to said zone within each layer to which said one pixel is assigned.

5. The prescription farming control system of claim 1, further comprising:
a display monitor mounted in the applicator vehicle;
means for producing a graphic image of an operator selectable one of said number of layers of said digital map on said monitor; and
means for displaying a symbol representing the vehicle at a location on said graphic image corresponding to the absolute position of the vehicle relative to the field.

6. The prescription farming control system of claim 5, wherein said means for displaying a symbol of the vehicle includes means for varying the width of said symbol relative to said graphic image in relation to the effective width of coverage of the spreading mechanisms of the vehicle.

7. The prescription farming control system of claim 1, wherein said means for storing information and said means for storing a data table each includes a computer memory having storage locations for information related to up to ten (10) layers, each having up to fifty (50) zones.

8. The prescription farming control system of claim 5, wherein said means for displaying a symbol representing the vehicle includes
means for producing an egocentric display; and
means for translating and rotating said graphic image of the selected layer relative to said egocentric vehicle display in relation to movement of the vehicle through the field.

9. The prescription farming control system of claim 4, further comprising:
a display monitor mounted in the applicator vehicle;
means for producing a graphic image of an operator selectable one of said number of layers of said digital map on said monitor; and
means for displaying a symbol representing the vehicle at a location on said graphic image corresponding to the absolute position of the vehicle relative to the field.

10. The prescription farming control system of claim 9, wherein said means for displaying a symbol representing the vehicle includes
means for producing an egocentric display; and
means for translating and rotating said graphic image of the selected layer relative to said egocentric vehicle display in relation to movement of the vehicle through the field, said means including means for translating and rotating said vertices of each of said zones of the displayed layer.

11. The prescription farming control system of claim 1, further comprising means for preventing the application of a product when the current position of the vehicle is within a portion of the field over which the vehicle has already traveled.

12. The prescription farming control system of claim 11, wherein said means for preventing includes:
means for modifying control signal values stored in said data table for each of said layers associated with the global coordinates of said portion of the field, wherein said modified control signal values correspond to an inactive state of the corresponding device controller.

13. A control system for use in controlling functional components of a vehicle operable to change its global position, each of the functional components capable of controllable levels of activity, each functional component having device controller which controls the operation of the corresponding component in response to a control signal derived in accordance with a predetermined prescription of operation over a tract of land, the control system comprising:
means for storing in a digital memory information defining a digital map representative of the prescription over the tract of land, the map being defined by a number of layers, each layer corresponding to one of the functional components, and each layer including a number of zones, each zone corresponding to a level of activity of the corresponding component in accordance with the prescription for the tract of land at a plurality of global positions within the zone;
means for storing a data table containing control signal values for each of said number of zones in each of said number of layers, said control signal values being indicative of the level of activity of the functional component associated with a corresponding layer at positions of the vehicle within a corresponding zone;
navigation means for determining the current position of the vehicle on the tract of land in global coordinates as the vehicle moves over the tract; and
means for transmitting, to each device controller, selected ones of said control signal values corresponding to said zone of each layer for which the determined current position of the vehicle corresponds to one of said plurality of global positions within the zone.

14. A prescription farming control system for use in controlling product delivery mechanisms mounted on an applicator vehicle, the delivery mechanisms operable to deliver product to spreader mechanisms for spreading products over an agricultural field, each of the product delivery mechanisms having a device controller which controls the rate of operation of the corresponding delivery mechanism in response to a control signal derived in accordance with a prescription for the field, the control system comprising:
means for storing in a digital memory information defining the rate of operation of each of the delivery mechanisms at each of a plurality of global positions within the agricultural field;
a graphics processor having;
a graphics memory with an active invisible page and an inactive visible page;
means for digitally drawing a layer map corresponding to a user-selected one of the delivery mechanisms on said inactive page, and for visually displaying said layer map of said inactive page;
means for digitally drawing on said active page a layer map sequentially corresponding to the remaining ones of the delivery mechanisms;

wherein each layer map includes information indicative of the rate of operation of the corresponding mechanism;

navigation means for determining the current position of the applicator vehicle on the agricultural field in global coordinates as the vehicle moves over the field;

means for sequentially interrogating each layer map as it is drawn on said active page to read said information at a location on said each layer map corresponding to the determined current position of the applicator vehicle and generating a control signal value in relation to the rate of operation of the delivery mechanism corresponding to said location on each said layer map; and means for transmitting control signals to each of the device controllers based upon said control signal value obtained from each said layer map.

15. The prescription farming control system of claim 1, wherein:

said means for storing information includes information corresponding to the global position of a plurality of vertices, said plurality of vertices defining said number of zones for each layer; and said means for transmitting includes;

processor means for determining if said current position of the applicator vehicle is within a particular one of said number of zones; and means for reading said data table to obtain a control signal value corresponding to said particular zone within each layer.

16. The prescription farming control system of claim 13, wherein:

said means for storing information includes information corresponding to the global position of a plurality of vertices, said plurality of vertices defining said number of zones for each layer; and said means for transmitting includes;

processor means for determining if said current position of the applicator vehicle is within a particular one of said number of zones; and means for reading said data table to obtain a control signal value corresponding to said particular zone within each layer.

* * * * *